United States Patent
Turnage

(10) Patent No.: US 9,890,692 B1
(45) Date of Patent: Feb. 13, 2018

(54) MODULAR INTERCOOLER SYSTEM

(71) Applicant: Brett Turnage, Moreno Valley, CA (US)

(72) Inventor: Brett Turnage, Moreno Valley, CA (US)

( * ) Notice: Subject to any disclaimer, the term of this patent is extended or adjusted under 35 U.S.C. 154(b) by 0 days.

(21) Appl. No.: 15/630,742

(22) Filed: Jun. 22, 2017

(51) Int. Cl.
| | |
|---|---|
| F02B 29/04 | (2006.01) |
| F02M 35/10 | (2006.01) |
| F28F 21/02 | (2006.01) |
| F28F 9/02 | (2006.01) |
| F28D 7/16 | (2006.01) |
| F28D 21/00 | (2006.01) |
| F28D 9/00 | (2006.01) |

(52) U.S. Cl.
CPC ..... F02B 29/045 (2013.01); F02M 35/10268 (2013.01); F28F 21/02 (2013.01); F02B 29/0462 (2013.01); F28D 7/163 (2013.01); F28D 9/0075 (2013.01); F28D 2021/0082 (2013.01); F28F 9/02 (2013.01)

(58) Field of Classification Search
CPC .......................... F02M 35/10268; F28D 7/163
USPC .............................. 165/76, 78, 144, 171, 177
See application file for complete search history.

(56) References Cited

U.S. PATENT DOCUMENTS

| | | | | |
|---|---|---|---|---|
| 1,994,903 A | * | 3/1935 | Warrender | B21D 53/04 |
| | | | | 165/130 |
| 2,960,315 A | * | 11/1960 | Huffman, Jr. | F01P 3/20 |
| | | | | 123/41.51 |
| 3,633,660 A | * | 1/1972 | Young | F28F 9/162 |
| | | | | 165/173 |
| 4,183,402 A | * | 1/1980 | Cotter | F28D 1/0316 |
| | | | | 165/175 |
| 4,269,158 A | | 5/1981 | Berti | |
| 4,382,464 A | * | 5/1983 | Melnyk | F28F 9/001 |
| | | | | 165/149 |
| 4,607,684 A | * | 8/1986 | Wiard | F28D 1/0213 |
| | | | | 165/166 |
| 4,681,155 A | * | 7/1987 | Kredo | F28F 3/025 |
| | | | | 138/163 |

(Continued)

FOREIGN PATENT DOCUMENTS

EP        1336736 B1       6/2006

*Primary Examiner* — Len Tran
*Assistant Examiner* — Jenna M Hopkins
(74) *Attorney, Agent, or Firm* — Patent Analysis Research Tech. Systems LLC; George L. Walton

(57) ABSTRACT

An existing or new intercooler system is provided with modular fixed and removable mounting and support bracket plates that offers easy adaptability, reparability, serviceability that eliminates the need to replace an entire intercooler because a vehicle or automotive set up has been changed, portions of it has been damaged or because it has become clogged with debris. The modular and removable mounting and support bracket plates can turn existing or new intercoolers from a single automotive part into an automotive system with modular parts of different types and sizes that can be reconfigured, changed or replaced to make intercoolers fit different types of automotive system applications. These modular fixed and removable mounting and support bracket plates eliminates the need for all metal parts and permanent welding. The intercooler system having end tanks made of composite material with carbon fiber to eliminate heat retention and secured by bonding material.

20 Claims, 11 Drawing Sheets

(56) References Cited

U.S. PATENT DOCUMENTS

| | | | | |
|---|---|---|---|---|
| 4,730,668 A * | 3/1988 | Lemaster | | F28F 9/262 |
| | | | | 165/137 |
| 4,735,261 A * | 4/1988 | Huebner | | B29C 65/02 |
| | | | | 165/173 |
| 4,773,475 A * | 9/1988 | Sleep, Jr. | | F28F 9/0219 |
| | | | | 165/158 |
| 4,823,868 A | 4/1989 | Neebel | | |
| 4,872,504 A * | 10/1989 | Huebner | | B29C 65/02 |
| | | | | 165/54 |
| 4,926,934 A * | 5/1990 | Ivy | | F28F 9/0226 |
| | | | | 165/153 |
| 5,178,213 A * | 1/1993 | Watson | | F28D 1/05366 |
| | | | | 165/173 |
| RE35,098 E * | 11/1995 | Saperstein | | B23K 1/0012 |
| | | | | 165/175 |
| 5,482,113 A | 1/1996 | Agonafer et al. | | |
| 6,196,305 B1 * | 3/2001 | Geiger | | F28D 1/05366 |
| | | | | 165/149 |
| 6,374,911 B1 * | 4/2002 | Olson | | F28F 9/0226 |
| | | | | 165/134.1 |
| 6,805,108 B2 * | 10/2004 | Shaffer | | F02B 29/0462 |
| | | | | 123/563 |
| 7,290,594 B2 | 11/2007 | Chan | | |
| 7,793,710 B2 | 9/2010 | Lamich et al. | | |
| 8,016,025 B2 | 9/2011 | Brost et al. | | |
| 8,316,925 B2 | 11/2012 | Pimentel et al. | | |
| 8,651,092 B2 | 2/2014 | Ghiani | | |
| 9,038,607 B2 * | 5/2015 | Norman | | F01P 1/00 |
| | | | | 123/41.02 |
| 9,175,596 B2 | 11/2015 | Eilemann et al. | | |
| 9,328,966 B2 * | 5/2016 | Brauning | | F28D 1/05366 |
| 2002/0023734 A1 * | 2/2002 | Wagner | | F28D 1/05366 |
| | | | | 165/81 |
| 2002/0029872 A1 * | 3/2002 | Jamison | | F28D 1/0316 |
| | | | | 165/153 |
| 2004/0069446 A1 * | 4/2004 | Horiuchi | | F28D 1/0443 |
| | | | | 165/43 |
| 2004/0250988 A1 * | 12/2004 | Machanek | | F28D 1/0443 |
| | | | | 165/76 |
| 2005/0092470 A1 * | 5/2005 | Heine | | F28D 1/0435 |
| | | | | 165/140 |
| 2006/0196635 A1 * | 9/2006 | Lesage | | B21D 53/085 |
| | | | | 165/76 |
| 2007/0251678 A1 * | 11/2007 | Vorpahl | | F28F 9/0246 |
| | | | | 165/139 |
| 2008/0121384 A1 * | 5/2008 | Tseng | | F28D 1/05375 |
| | | | | 165/149 |
| 2010/0032149 A1 * | 2/2010 | Roll | | F28D 1/05366 |
| | | | | 165/175 |
| 2011/0277958 A1 * | 11/2011 | Richardson | | F28D 1/05383 |
| | | | | 165/76 |
| 2013/0025838 A1 * | 1/2013 | Kato | | F28D 1/05366 |
| | | | | 165/173 |
| 2013/0146267 A1 * | 6/2013 | Garret | | F28D 7/1684 |
| | | | | 165/175 |
| 2014/0318120 A1 * | 10/2014 | Svihla | | F02B 29/0406 |
| | | | | 60/599 |
| 2015/0060027 A1 * | 3/2015 | Tawa | | B21D 53/02 |
| | | | | 165/143 |
| 2015/0352517 A1 * | 12/2015 | Tanabe | | B01J 35/02 |
| | | | | 422/198 |
| 2016/0054076 A1 * | 2/2016 | Krell | | F28D 1/0477 |
| | | | | 165/175 |
| 2017/0115069 A1 * | 4/2017 | Ferrand | | F28D 7/163 |

* cited by examiner

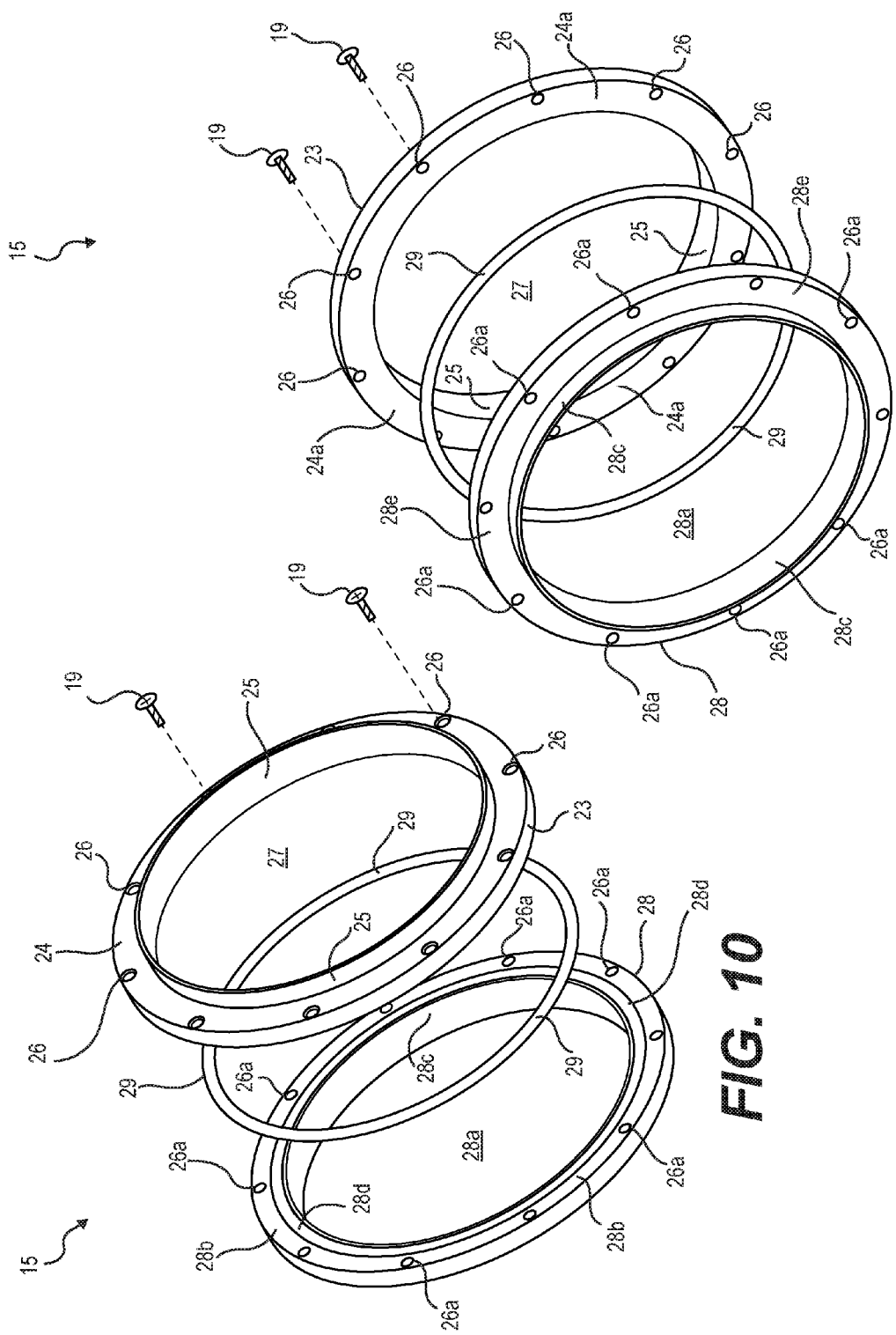

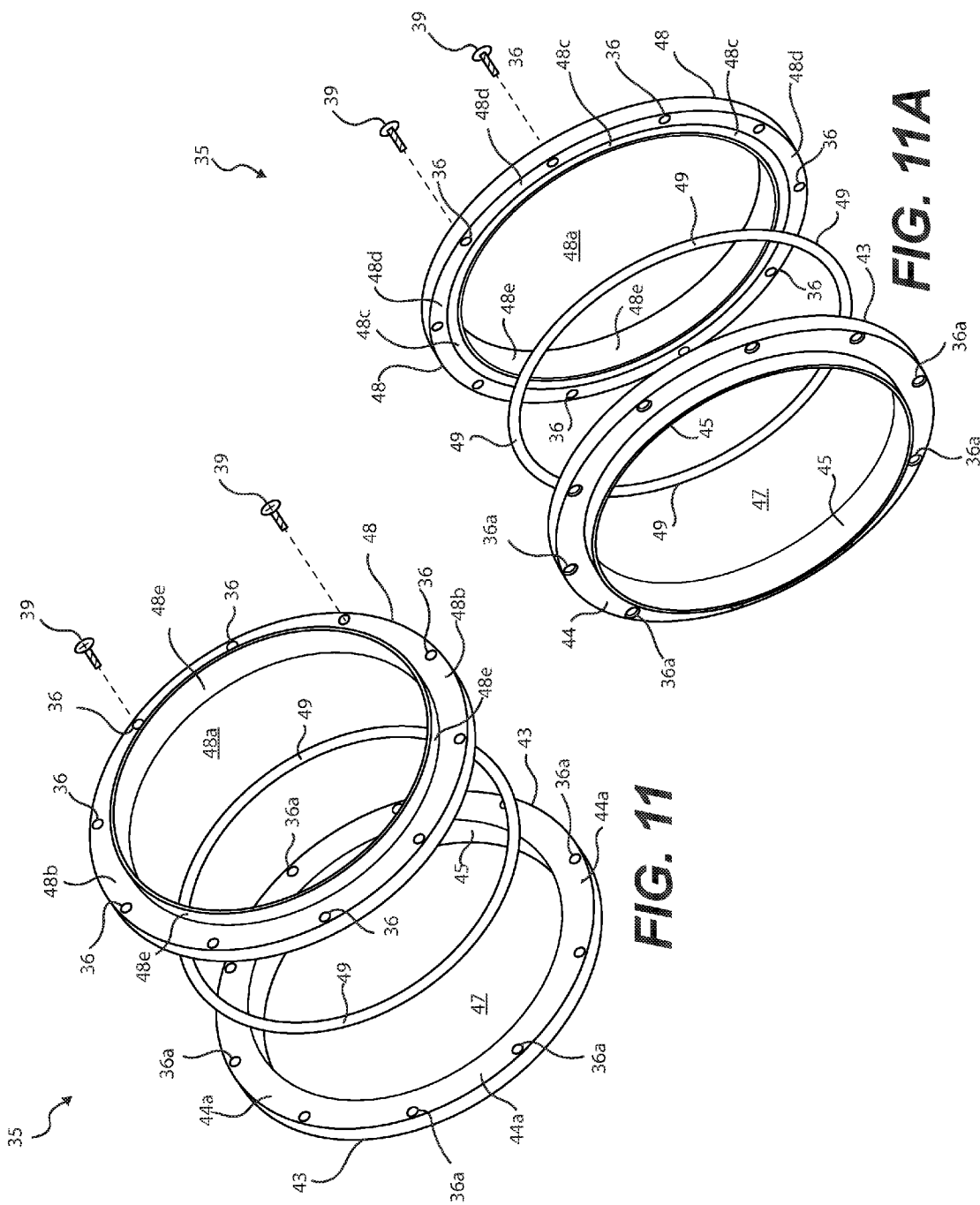

MODULAR INTERCOOLER SYSTEM

CROSS REFERENCE TO RELATED APPLICATION(S)

None

BACKGROUND OF THE INVENTION

1. Field of the Invention

The present invention relates generally to a new and useful improvement in current or existing intercoolers by turning a single automotive part into an automotive system design with modular components that can be reconfigured, changed or replaced to make existing intercoolers fit a variety of applications. These modular components take the form of a plurality of fixed and removable flange or bracket mounting and/or support plates.

2. Description of the Related Art

It is well known in the art that the standard and typical intercoolers are conventionally used in turbocharged or supercharged engines to cool down the charge air prior to it entering the combustion chambers. Note that these typical intercoolers are normally placed between an outlet of the turbocharger or the supercharger and an intake manifold.

The conventional or current existing intercoolers include a first end tank member at an upper or first end that is provided with bypass and flow control means operable to bypass a heat exchanger member and for controlling a flow rate of air through the heat exchanger member. This intercooler member has an upper or first partition flange member that is permanently welded to the upper or first partition flange member. A lower or second end of the intercooler includes a second end tank member with an upper or second partition flange member that is permanently welded to the lower or second partition flange member of the intercooler.

This design arrangement can include a single inlet in the upper or first end tank member that is adapted to be connected to an intake manifold for transferring heated compressed air through the intercooler member to a single outlet in the lower or second end tank member to a combustion engine (not shown).

At the present time, there are many different types of intercoolers that can be utilized with the present invention. Note that the term intercoolers are being used in a preferred automotive system. However, other automotive systems, such as, radiators, heat exchangers and water-to-air intercoolers can also be used with the modular brackets or flanges of the present invention.

Also standard and typical intercoolers are permanently fixed at the joints and include a core therein and end tanks disposed on opposite ends. These parts are permanently fixed via a welding if the material is aluminum or bonded if the material is plastic. Note that the permanent joints do not allow for maintenance, modification or interchangeability. These standard and typical intercoolers do not use materials selected from the group consisting of lightweight composites such as, carbon fiber, which are not welded, but rather bonded by an epoxy means. Such prevents anyone from changing the style of the typical and standard intercoolers/heat exchangers, if they wanted two outlets rather than one outlet or need a shorter or smaller end tank design or one that possibly curves. They would have to cut off the end tank, which may damage or destroy the typical intercoolers or they would have to build a brand new intercooler. Also, if one wants to increase the size of a core they would have to buy new intercooler.

Note that none of these intercoolers teaches the new and useful improvement of the present invention, alone or in combination with one another and/or with other features found in the following and other non-cited prior art patents.

In light of the present invention, the best prior art patents that were found do not teach an intercooler with the interchangeable modular bracket or flange components that will accommodate a variety of applications. Such intercooler systems are identified as follows:

U.S. Pat. No. 4,269,158 A teaches an intercooler for an internal combustion engine with an air pipe end that is connected to one end of an intake manifold with a gasket disposed there between by a plurality of bolts. The other end of the intake manifold is connected to one end of the intercooler with a gasket disposed there between by a plurality of cap screws or studs. Also, the other end of the intercooler is connected with the aforementioned plurality of cap screws or studs that extends through the intercooler to an engine head with a gasket disposed there between.

U.S. Pat. No. 4,823,868 A teaches an intercooler housing having an open end with a plurality of threaded cap screw holes disposed therein. The open end of the intercooler housing allows an intercooler core with a support flange extending around the periphery thereof with a first plurality of cap screw holes to be inserted therein. A second plurality of cap screw holes is disposed about the periphery of a first gasket. One side of the support flange rests on the open end with one side of the first gasket disposed there between. Also, the second plurality of screw holes is positioned in alignment with the plurality of threaded cap screw holes and the first and second plurality of cap screw holes.

A second gasket having one side that is supported on the other side of the support flange with a third plurality of cap screw holes disposed there about and in alignment with the plurality of threaded cap screw holes, and the first and second plurality of cap screw holes, and the first and second plurality of cap screw holes. Further, an intake manifold has one end that rests on an opposite side of the second gasket. The intake manifold includes a fourth plurality of cap screw holes that extend there through from one end to an opposite end thereof. A plurality of threaded cap screws extends through the fourth, third, second and first plurality of cap screw holes and into the plurality of threaded cap screw holes to removably connect the intake manifold, the second and first gaskets, the intercooler core and the intercooler housing as a unit.

U.S. Pat. No. 5,482,113 A teaches a convertible or modular heat exchanger for air or water cooling of electronic circuit components and the like. The heat exchanger includes a top securing base plate. A water cooling shroud 40 with a top base plate 41 can be connected with the heat exchanger securing base plate. Alternately, the heat exchanger securing base plate can be connected to a top base plate of an air cooling shroud. Note that the base plates can have any conventional sealing means disposed there between. Also, the sealing means, such as gaskets and seals between the base plates may be connected together by clamps, bolts, screws or other fastening mechanisms. Finally, the heat exchanger, shrouds, base plates/flanges and fins can be made of different types of materials, such as, aluminum, copper, stainless steel, polymeric (plastics, polycarbonate) and other metals and polymeric materials, if desired. The type of materials used is based on heat resistant and the compatibility to cooling fluids.

U.S. Pat. No. 7,290,594 B2 teaches an intercooler with an intake manifold on one end and an intake manifold on an opposing end and being attached to an automobile. The intercooler has a body with a top end and bottom end for receiving a decorative plate thereon. These decorative plates are welded to the top and bottom ends and the intake to form a unitary intercooler unit. A pair of spaced keyed holes is defined in the decorative plates to receive a hollow bolt and nut mechanism to resist rotation. Each of the hollow bolts includes a threaded passage for receiving attachment bolts there through to removably secure the intercooler unit to upper and lower brackets of the automobile.

U.S. Pat. No. 7,793,710 B2 teaches an intercooler/heat exchanger in association with an internal combustion engine having a pair of upper connection plates and a bottom connection plate being attached to and covering the upper and bottom ends of the intercooler/heat exchanger that can either be soldered and/or connected together by fasteners to a housing casing. The upper plates are co-operably associated with an inlet and an outlet intake tubes at one end thereof and the other end with a flow dome that communicates with and closes pair of collection tubes or chambers at opposite ends of the heat exchanger/intercooler at top end thereof and the bottom connection plate closes and in flow communication with the bottom end of the pair of collection tubes or chambers at opposite ends of the heat exchanger/intercooler.

U.S. Pat. No. 8,016,025 B2 teaches a modular heat exchanger, such as a charge air cooler with a pair of top connecting flange plates where the connecting flange plates are connected to intake and outlet pipes. The pair of top connecting flange plates includes corner fastening holes for securing the modular heat exchanger within and to a housing member. Also, the charge air cooler includes a plurality of stacked plates and ribs inserted within a frame.

U.S. Pat. No. 8,316,925 B2 teaches a modular heat exchanger, such as a charge air cooler having a top end tank that includes a periphery securing flange and a top connecting header plate removably attached to a housing periphery flange member of a housing member. The housing member includes a housing chamber for receiving the cooler core therein. Also, the top end tank includes an intake or entry tube or duct and an outlet or tube or duct. A gasket is disposed between the header plate and the housing periphery flange member. In addition, the cooler core includes tubes, fins, side plates, a bottom plate, a lower tank and a plurality of stacked plates.

U.S. Pat. No. 2012/0061053 A1 teaches a charge air intercooler having a floor plate member, a pair of flow connectors attached to a first tank collector with a flange plate including a collar that is removably attached the floor plate member. An O-ring seal is inserted between floor plate member and collar. Note that screws, welds or glue can be used for securing means. A second tank collector is disposed at an opposite end of the charge air intercooler. Also, the flange is removably secured to a suction tube with a seal member.

Patent No. 2014/0246186 A1 teaches a modular heat exchanger, such as a charge air cooler having an end tank member with an inlet and outlet flow nozzles. The end tank member includes a peripheral edge flange plate member that is removably attached to an upper flange plate member at one end of a housing of the charge air cooler. A lower flange plate member is removably secured against another end of the charge air cooler housing. An O-ring seal is disposed between the upper and lower flange plate members and the charge air cooler housing.

Patent No. EP 1,336,736 B1 teaches first and second tank parts fixedly secured to top and bottom partition walls/flanges on opposite ends of an intercooler/heat exchanger of an engine.

Also, U.S. Pat. Nos. 8,651,092 B2, 9,175,596 B2, 2008/0245514 A1 are cited as prior art of interest.

Note that none of the above mentioned prior patents teaches the unique present invention singly or in any combination thereof, which will be discussed in greater detail in the "Summary of the Invention", recited below.

SUMMARY OF THE INVENTION

It is an object of the present invention to turn an existing or any new intercooler from a single automotive part into an automotive system with a modular system with the use of different types and sizes of fixed and easy removable modular mounting and support bracket plates that can be reconfigured, changed or replaced to make an intercooler fit different types of automotive system applications.

It is another object of the present invention to provide an existing or any new intercooler with modular and removable mounting and support bracket plates that offers easy adaptability, reparability, serviceability that eliminates the need to replace an entire intercooler because a vehicle or automotive set up has been changed, portions of it has been damaged or because it has become clogged with debris.

It is a further object of the present invention to provide at least a pair of the modular fixed and easy removable mounting and support bracket plates that includes a pair of first bottom plate members and second top plate members, the first bottom plate members and the second top plate members having a pair of annular flow communication openings disposed therein, each of the first bottom plate members is fixed by a mechanical bond connection, such as a weld to a top and bottom open end of an intercooler and each of the second top plate members is removably secured to each of the first bottom plate members by removable screw fastening members through a plurality of aligned securing holes about an outer periphery of each of the first bottom and second top plate members.

The pair of annular flow communication openings are partitioned by an intermediate partition divider that extends across and interconnected to opposite sides of the annular flow communication openings of the first bottom and second top plate members to allow flow communication between at least an inlet and outlet of the intercooler. Also, each of the second top plate members include an annular upstanding peripheral wall or rim portion. The outer periphery of the pair of annular partitioned flow communication openings are surrounded by the annular upstanding peripheral wall or rim portions of the second top plate members to allow an open flow communication between the at least an inlet and outlet of the intercooler through the pair of annular partitioned openings of each of the first bottom and second top plate members.

It is also another object of the present invention to provide a peripheral and annular sealing ring channel or groove disposed along a top peripheral surface spaced inward of the plurality of securing holes of each of the first bottom plate members. A peripheral and annular sealing ring is disposed between each of the first bottom and second top plate members and received within the peripheral and annular sealing ring channel or groove of each of the first bottom plate members to maintain an effective seal there between when the first bottom and second top plate members are fastened together and moving the intermediate dividers into engagement with one another to prevent damage and over compression of each of the peripheral and annular sealing rings. Note that the peripheral and annular sealing channel or groove can be positioned on either one of the first bottom and second top plate members, if desired.

It is a further object of the present invention to provide intercoolers with different types of interchangeable end tank arrangements, such as a single inlet and outlet on opposite ends of single end tanks, twin intercoolers with separate end tanks having a pair of inlets on one end thereof with a common center outlet disposed at another end of the twin intercoolers and connected there between, an inlet and outlet disposed on end tanks positioned on opposite ends of an intercooler, and two inlets on end tanks on one side of the intercooler and the outlet side may have only one outlet if a vehicle has two power adders and only one throttle body.

It is yet another object of the present invention to secure a lower end portion of the different types of interchangeable end tank arrangements over the annular upstanding peripheral wall or rim portion of the second top plate members by a bonding material. The annular upstanding peripheral wall or rim portion of each of the second top plate members are secured to the lower end portion of the end tank arrangements that uses an epoxy material rather than a weld as the bonding material. This allows the end tank arrangements to be made of composite lightweight carbon fiber materials that offer better heat transfer, heat resistant and consumer cost saving benefits.

It is also a further object of the present invention to provide the end tanks inlets and outlets with openings adapted to receive at least a pair of identical and interchangeable modular removable mounting and support bracket ring-like plate members that includes a first bottom ring-like plate member and a second top ring-like plate member connected together to form a unitary ring-like plate assembly. The first bottom ring-like plate member having a top end including an upstanding peripheral wall or rim portion that is secured within the end tanks inlet and outlet openings by a bonding material selected from the group consisting of adhesives, glues and epoxies.

Each of the first bottom ring-like plate members and the second top ring-like plate members of the end tanks inlets and outlets includes a plurality of fastening holes disposed on an outer peripheral edge surface thereof. A screw fastening member extends through each of the plurality of fastening holes to connect the first bottom ring-like plate members and the second top ring-like plate members to the end tanks inlets and outlets as a removable and interchangeable plate assembly.

Note that one of the unitary ring-like plate assemblies includes a flow conduit having one end that is attached thereto and in flow communication with the end tank inlet, and the other end of the flow conduit is connected to power adders, such as turbochargers and superchargers. Also, at the end tank outlet another unitary ring-like plate assembly is attached thereto. The annular upstanding peripheral wall or rim portion of the first bottom ring-like plate member of another one of the unitary ring-like plate assemblies at the end tank outlet is secured therein. A flow conduit having one end that is secured to and over the upstanding wall or rim portion of the second top ring-like plate member of the another unitary ring-like plate assembly at the end tank outlet opening by the bonding material selected from the group consisting of adhesives, glues and epoxies and the other end of the flow conduit is connected to or directly to a throttle body and to a manifold.

Optionally, other types of fastening or securing means can be utilized with the modular fixed and removable mounting and support bracket plate assemblies and the identical and interchangeable modular removable mounting and support bracket ring-like plate assemblies.

In addition, a further object of the present invention to provide a peripheral and annular sealing ring channel or groove disposed along a bottom peripheral surface spaced inward of the plurality of fastening holes of the at least a pair of identical and interchangeable modular removable mounting and support bracket ring-like plate members of the end tanks inlets and outlets. A peripheral and annular sealing ring is disposed between the at least a pair of modular removable mounting and support bracket ring-like plate members of the end tanks inlets and outlets and received within the peripheral and annular sealing ring channel or groove to maintain an effective seal there between when the at least a pair of modular removable mounting and support bracket ring-like plate members of the end tanks inlets and outlets are fastened together by the screw fastening members. Note that the peripheral and annular sealing channel or groove can be on either one of the first bottom and second top plate members of the at least a pair of modular removable mounting and support bracket ring-like plate members of the end tanks inlets and outlets, if desired.

Note that the modular design defining the removable mounting and support bracket ring-like plates of the end tanks inlets and outlets allows for end tanks to be customized and the flow characteristics can be tested in a fluid dynamic program so that the entire intercooling system can be certified to flow a specific cubic foot per minute (cfm) number, rather than just having the intercooler core certified and end tanks that have not been tested can hinder the performance of the intercooler system.

Additional aspects, objectives, features and advantages of the present invention will become better understood with regard to the following description and the appended claims of the preferred embodiments with reference to the accompanying drawings.

BRIEF DESCRIPTION OF THE DRAWINGS

The present invention may be better understood, along with its numerous objects, features and advantages made apparent to those skilled in the art by referencing the accompanying drawings.

FIG. 10 illustrates an exploded isometric view of a pair of end tank identical and interchangeable modular removable mounting and support bracket ring-like plates with screw fastening members and a sealing groove disposed on one of the pair of end tank removable mounting and support bracket ring-like plates with a seal member to be received therein and disposed there between according to the present invention.

FIG. 10A illustrates an exploded isometric and reverse oriented view of a pair of end tank identical and interchangeable removable mounting and support bracket ring-like plates with screw fastening members and a seal member disposed there between according to FIG. 10 of the present invention.

FIG. 11 illustrates an exploded isometric view of a pair of end tank identical and interchangeable modular removable mounting and support bracket ring-like plates with screw fastening members and a seal member disposed there between according to the present invention.

FIG. 11A illustrates an isometric and reverse oriented view of a pair of end tank identical and interchangeable modular removable mounting and support bracket ring-like plates with screw fastening members and a sealing groove disposed on another one of the pair of end tank modular removable mounting and support bracket ring-like plates with a seal member to be received therein and disposed there between according to FIG. 10 and FIG. 11 of the present invention.

DETAILED DESCRIPTION

Figure 1:
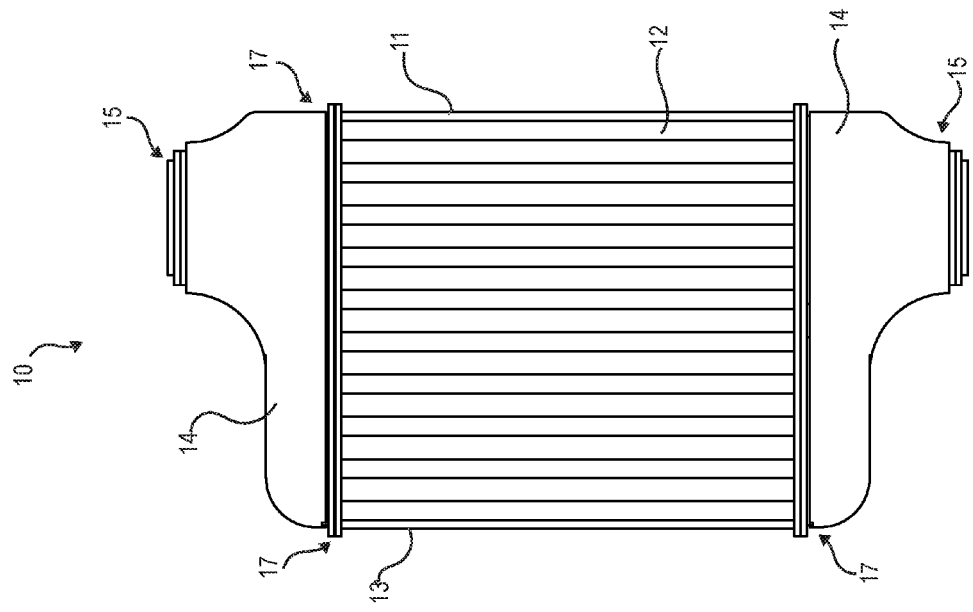
FIG. 1 illustrates an isometric view of a single inlet and outlet intercooler with modular fixed and removable mounting bracket plate members disposed at top and bottom open ends thereof with screw fastening members for removably securing the modular fixed and removable mounting bracket plate members to the top and bottom open ends of the intercooler and to top and bottom end tanks with identical and interchangeable modular removable mounting and support bracket plates ring-like plate members having screw fastening members for removably securing them to an inlet and outlet of the top and bottom end tanks according to the present invention.

The uniqueness of present invention relates to turning an intercooler from an existing or any new intercooler from a single automotive part into an automotive system with a modular system with the use of different types and sizes of fixed and easy removable modular mounting and support bracket plates that can be reconfigured, changed or replaced to make an intercooler fit different types of automotive system applications. The fixed and easy removable modular mounting and support bracket plates offers easy adaptability, reparability, serviceability that eliminates the need to replace an entire intercooler because a vehicle or automotive set up has been changed, portions of it has been damaged or because it has become clogged with debris. This modular design allows for the following key features:

A) Adaptability—The ability to assemble and disassemble an intercooler with the present invention fixed and easy removable modular mounting and support bracket plates instead of welding brackets, so that different sections of the intercooler can be interchanged or arranged in different configurations. This modular mounting and support bracket plate design can change an intercooler into an interchangeable system rather than a solid part. Also, this modular mounting and support bracket plate design can be changed around and modified by swapping sections that are different in design and size that will allow one existing or new intercooler to fit a variety of different applications. An intercooler with standard end tanks, even if the end tanks are dissimilar, can be rearranged into different configurations by simply flipping the end tanks around. This flexibility can move outlets and inlets to either the top or bottom of the intercooler core, they can be opposed to one another with an inlet being located at the top of one end tank and an inlet on the bottom of an opposing end tank with an outlet unit disposed there between, or dual inlets and/or outlets being disposed on opposing end tanks.

By swapping either the end tanks or intercooler cores the system can completely be changed in size, shape, number of inlets and outlets thickness of the intercooler core sections, as well as overall height. End tanks can be replaced with units that offer one inlet and/or outlet, change positioning of the inlets and outlets and offer different designs like curved or straight end tanks to clear some obstruction in an automotive vehicle with modular fixed and removable bracket plates of the present invention. With our modular fixed and removable mounting and support bracket plates, a system's intercooler core or flow capacity can be modified by changing the intercooler's length or thickness. It can be made longer by replacing the intercooler core with a longer version. Also, a system can be made taller by either replacing an intercooler core with a taller core or by using multiple end tanks on either side, or by stacking two intercooler cores and replacing the end tanks with larger versions. Similarly, a system can be made thicker by either using a thicker intercooler core and multiple end tanks or stacking two intercooler cores back to back, and using end tanks that act as if the two intercooler cores are one large unit.

To change a system from a single forced induction system to a twin turbocharged system with two inlets and one outlet, two intercooler cores can be placed side by side with a joining end tank placed in between to make a dual intercooler system. End tanks can be replaced with versions that have larger outlets, or have end tanks that are longer to provide better air flow, or shorter to fit into an automotive vehicle that offers little space with the modular removable bracket plates of the present invention.

Note that current or existing built intercoolers have a fixed size and dimensions, which restricts the number of applications that they can be used in. If one decided to change their forced induction system to a higher horsepower system, the intercoolers would have to be replaced with new intercoolers. However, with the modular fixed and removable mounting and support bracket plates and the modular removable mounting and support bracket ring-like plates of the present invention, current or existing intercoolers can be modified or interchanged to accommodate different applications.

B) Reparability—With today's current or existing intercooler technology, if any section of a current or existing intercooler is damaged, the entire unit may have to be discarded because it cannot be used again (this becomes junk or scrap). If an intercooler core is punctured or an end tank is crushed, then the entire unit cannot be used again (this becomes junk or scrap). This raises cost for consumers as well as organizations that are involved in professional racing where crashes are prevalent because an entire intercooler system becomes very expensive to replace or purchase. Therefore, racing teams must have multiple intercoolers on standby. Note that with our modular fixed and removable mounting and support bracket plates, and the modular removable mounting and support bracket ring-like plates, only a damaged part of the intercooler needs to be removed and replaced. This can be done quickly and cheaply because replacing a part in an intercooler system is much cheaper than replacing an entire intercooler system. For racing teams, this drives down costs because only replacement parts need to be stocked, so if an intercooler system is damaged, the racing team can quickly and easily remove replace any broken or damaged part and the intercooler system can be quickly put back in service. This can only happen with the fixed and removable mounting and support bracket plates and the modular removable mounting and support bracket ring-like plates of the present invention.

C) Serviceability—Since intercoolers are placed inside of a forced induction system with either a supercharger or turbocharger that is supplied with oil, as well as being positioned in between a PCV bypass valve and air filter that are susceptible to oil and debris accumulating inside the end tanks and getting on the crucial intercooler vanes. This can destroy intercooler efficiency. Normally when one tries to clean accumulated debris from the inside of intercoolers with water and soap, it does not clean the debris effectively. As a result, these intercoolers may need to be discarded and replaced, which raises costs.

With the modular fixed and removable mounting and support bracket plate design, debris and oil can be effectively cleaned from the inside of intercoolers by easily removing the end tanks. Then intercooler cores can be submerged in cleaning solution without risking damage or residual cleaning fluid being left inside the intercoolers. Should there be any remaining residual fluid left within the intercoolers, such residual fluid can be easily removed by air blowing it dry. This offers a solution that intercooler owners have never had, and provide the ability to effectively clean their entire intercooler unit (end tanks and intercooler core unit), which lengthens the life of intercoolers and keep their efficiency at the highest level.

D) Use of unique materials—because existing intercoolers are often welded, metal is usually the material that end tanks are made from that retains heat, so intercoolers in a hot environment can suffer heat soak, where the intercoolers become so hot that they cannot work effectively. An intercooler system with the use of the modular fixed and removable mounting and support bracket plates and the modular removable mounting and support bracket ring-like plates of the present invention can use end tanks made of lighter composite materials, such as carbon fiber that shed heat rather than retaining it. This allows an intercooler to be lighter and work better in high temperature environments than the existing intercoolers with all metal parts.

E) Ability to refine end tank design and flow characteristics—Existing complete intercoolers are not certified with flow numbers. Only the intercooler core has been flow tested and is certified to flow a specific amount of air flow or cfm. The design of the end tanks can drastically affect the cfm number. As a result of this, customers will buy an intercooler that can support a specific amount of horsepower, but if the end tanks are not designed correctly, the cfm number can be drastically reduced. With the modular fixed and removable mounting and support bracket plates and the modular removable mounting and support bracket ring-like plates of the present invention, intercoolers can be customized and the flow characteristics of the customized end tank design can be tested in a fluid dynamics program.

In the end, the entire customized intercooler system can be flow tested and certified to flow a certain amount so customers can buy an entire intercooler system that meets their cfm number (flow requirements) rather than just an intercooler core with current end tank designs that may greatly hinder its efficiency. Note that the ability to test and perfect intercooler performance by swapping current end tanks with the modular fixed and removable mounting and support bracket plate design of the present invention to enhance better flow characteristics. This allows customers to buy an intercooler that is a more advanced intercooler system that they can adapt to a specific application that will meet their needs and flow tested as a complete intercooler system. Further, the modular fixed and removable mounting and support bracket plate customized design of the present invention will greatly reduce cost for customers, which is one of the greatest benefits of this customized design.

Finally, the key benefits of the modular fixed and removable mounting and support bracket plate and the removable mounting and support bracket ring-like plate customized design of the present invention have been identified and described as recited above. Now a description of the key components and features as illustrated in the drawings will now be discussed in greater details.

FIG. 1 illustrates a perspective isometric view of a single inlet and outlet intercooler and end tanks with modular fixed and removable mounting and support bracket plates and screw fastening members defining an intercooler system represented by reference number 10. The intercooler system includes an intercooler housing 11, front and rear or back walls 12 (front wall shown in FIG. 1 and rear wall shown in FIG. 2), a pair of side walls 13 (see FIG. 1), upper and lower end tanks 14 having upper and lower ends, and each of the upper and lower end tanks 14 and top and bottom open ends of the intercooler housing 11 having a modular fixed and removable mounting and support bracket plate bracket plate assembly 17 attached there between. The modular fixed and removable bracket plate assembly 17 includes a plurality of fastening or securing holes 18 and 18a and fastening screws 19, which will be described in greater details later. Also, each of the upper and lower end tanks 14 includes an opening 14b (see FIG. 3) defining a single inlet and outlet for receiving an identical and interchangeable modular removable mounting and support bracket ring-like plate assembly 15. These identical and interchangeable modular removable mounting and support bracket ring-like plate assemblies 15 can take on other shapes or configurations other than a ring-like shape, if desired. Also, the modular fixed and removable mounting and support bracket plate assembly 17 can take on other shapes or configurations other than a rectangular shape as shown, if desired.

Figure 2:
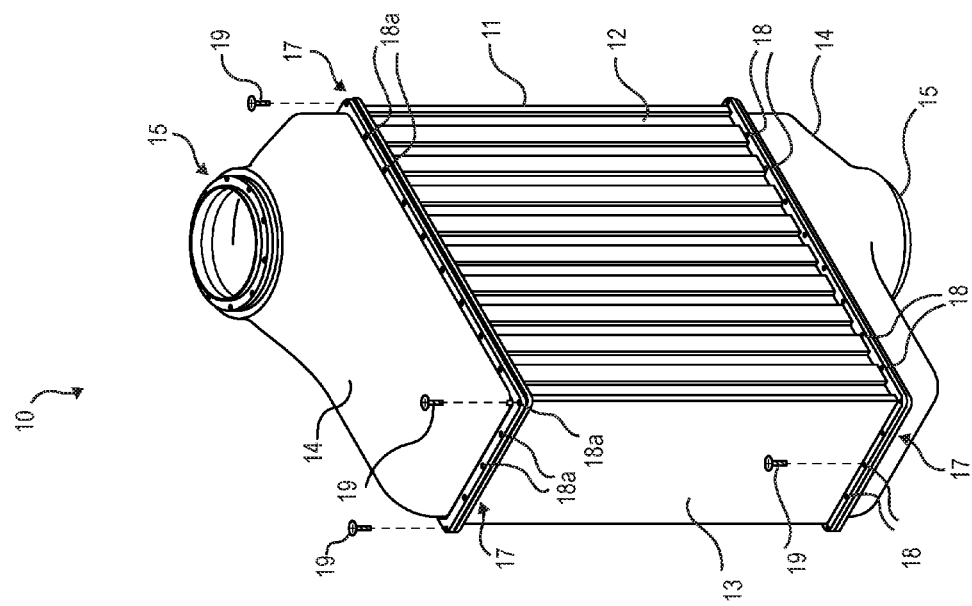
FIG. 2 illustrates a perspective rear view of the single inlet and outlet intercooler with the modular fixed and removable mounting and support bracket plate members removably attached thereto and the top and bottom end tanks with the identical and interchangeable removable mounting and support ring-like plate members removably attached thereto as shown in FIG. 1 according to the present invention.
Figure 3:
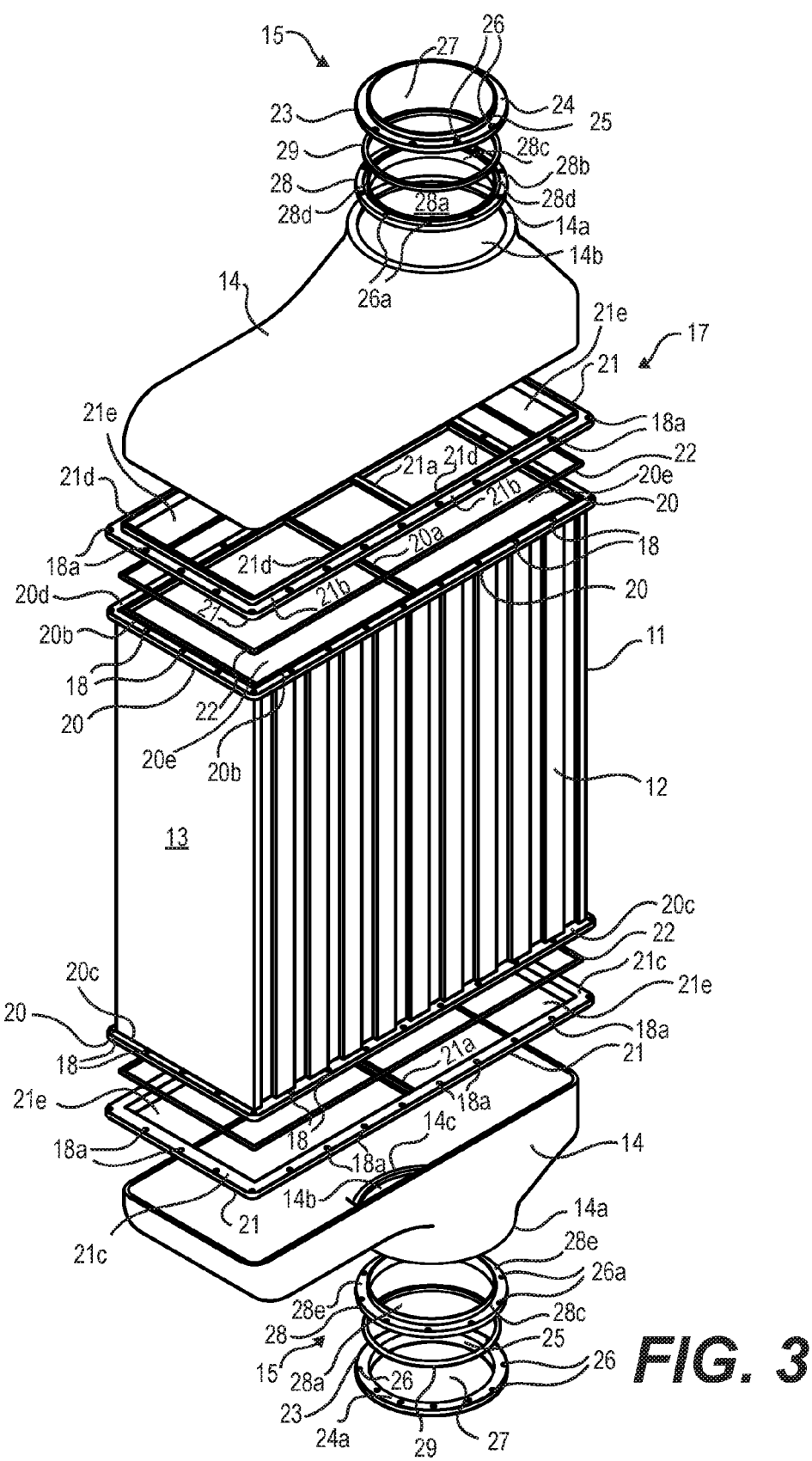
FIG. 3 illustrates an exploded view of the single inlet and outlet intercooler with modular fixed and removable mounting bracket plate members disposed at top and bottom open ends thereof with screw fastening members for removably securing the modular fixed and removable mounting bracket plate members to the top and bottom open ends of the intercooler with single inlet and outlet end tanks secured thereto at both of the intercooler open ends and the end tanks having identical and interchangeable modular removable mounting and support bracket ring-like plate members with screw fastening members for securing them to the single inlet and outlet end tanks according to FIG. 1 of the present invention.

FIG. 2 illustrates a perspective rear view of the single inlet and outlet intercooler housing 11 and end tanks 14 with the modular fixed and removable mounting and support bracket plate assembly 17 at the top and bottom of the intercooler housing 11 and the modular fixed and removable mounting and support bracket ring-like plate assembly 15 disposed about the inlet and outlet opening 14b (as shown in FIG. 3). Also, FIG. 2 shows the rear or back wall 12 of the intercooler housing 11.

FIG. 3 illustrates an exploded view of the single inlet and outlet intercooler and end tanks with modular fixed and removable mounting and support bracket plates and screw fastening members defining an intercooler system represented by reference number 10 as shown in FIG. 1 above. The intercooler system 10 includes an intercooler housing 11, front and rear or back walls 12 (front wall shown in FIG. 1 and rear wall shown in FIG. 2), a pair of side walls 13 (see FIGS. 1-2), upper and lower end tanks 14 having upper and lower ends, and each of the upper and lower end tanks 14 and a top and bottom open end of the intercooler housing 11 having a modular fixed and removable mounting and support bracket plate assembly 17 attached there between. The modular fixed and removable mounting and support bracket plate assembly 17 includes a plurality of fastening or securing holes 18 and 18a and fastening screws 19, which will be described in greater details below. Each of the upper and lower end tanks 14 includes an opening 14b defining either a single inlet or outlet for receiving one of the identical and interchangeable modular removable mounting and support bracket ring-like plate assembly 15.

Also, the modular fixed and removable mounting and support bracket plate assembly 17 includes a first bottom plate member 20 with an upper surface 20d that includes the plurality of fastening or securing holes 18 about an outer peripheral edge thereof and an annular sealing groove or channel 20b is positioned and spaced inward of the plurality of fastening or securing holes 18. The first bottom plate member 20 has a lower or bottom flat surface 20c that is welded to the top and bottom open ends of the intercooler housing 11. This is the only plate member of the modular fixed and removable mounting and support bracket plate assembly 17 that is permanently fixed. In addition, the first bottom plate member 20 has an intermediate partition divider 20a that defines a pair of sectional flow communication openings 20e in flow cooperation with the inlet and outlet openings 14b of the end tanks 14.

An annular seal member 22 has the same shape as the annular sealing groove or channel 20b with at least a portion of the annular seal member 22 being disposed therein with at least a remaining portion thereof being extended above the annular sealing groove or channel 20b. Note that the annular seal member 22 and the annular sealing groove or channel 20b can be of different sizes, if desired.

Further, the modular fixed and removable mounting and support bracket plate assembly 17 includes a second top plate member 21 with an upper surface 21b that includes the plurality of fastening or securing holes 18a. The second top plate member 20 has a lower or bottom flat surface 21c that engages and compresses the at least a remaining portion of the seal member 22 to provide an effective seal between the second top plate member 21 and the first bottom plate member 20 when the plurality of fastening or securing holes 18 of the first bottom plate 20 and the plurality of the fastening or securing holes 18a are aligned with one another and fastened together by the plurality of screw fastening members 19. Also, the second top plate member 21 is disconnected from the first bottom plate member 20 so that the first bottom plate member 20 and the end tanks 14 are secured together as a single unit to be easily removed so that cleaning and repair or replacement of an intercooler core (not shown) within the intercooler housing 11 can be performed, to allow cleaning of the interior of the intercooler housing 11 of any debris and clogging therein and cleaning and interchanging or swapping of the end tanks 14, which provides an economic cost savings to customers.

Also, the second top plate member 21 has an intermediate partition divider 21a that engages and is supported on the intermediate partition divider 20a of the bottom plate member 20 only when they are fastened together by the plurality of screw fastening members 19 to prevent damage and over compression of the annular seal member 22 and defining a pair of sectional flow communication openings 21e that aligns with the pair of sectional flow communication openings 20e of the lower plate member 20 to provide flow communication with the inlet and outlet openings 14b of the end tanks 14.

The second top plate member 21 has an upward extending rim or wall portion 21d positioned inward of the plurality of fastening or securing holes 18a and along an inner peripheral edge thereof. This upward extending rim or wall portion 21d surrounds the pair of sectional flow communication openings 21e and the intermediate partition divider 21a so that the pair of sectional flow communication openings 21e are aligned with the pair of sectional flow communication openings 20e of the lower plate member 20 and is able to provide unimpeded flow communication with the inlet and outlet openings 14b of the end tanks 14. Each of the upward extending rim or [44] wall portions 21d is disposed within the lower ends of the end tanks 14 and secured therein by a bonding material selected from the group consisting of epoxies, glues and adhesives. This allows the end tanks 14 and the first bottom plate members 20 to be easily removed as a single unit for changing, modifying, swapping, cleaning and repairing to reduce expensive intercooler system repair, damage and debris clogging costs.

Further, the end tanks 14 include a top inner rim surface portion 14a that borders the inlet and outlet openings 14b of the end tanks 14. The inlet and outlet openings 14b of the end tanks 14 are adapted to receive the identical and interchangeable modular removable mounting and support bracket ring-like plate assembly 15. The identical and interchangeable modular removable mounting and support bracket ring-like plate assembly 15 includes a first bottom ring-like plate member 28 that is positioned in a downward orientation (see FIGS. 3 and 10) with a lower or bottom surface 28b that includes a plurality of fastening or securing holes 26a disposed about an outer peripheral edge thereof and a peripheral and annular sealing groove or channel 28d is positioned and spaced inward of the plurality of fastening or securing holes 26a on the lower surface 28b. The first bottom ring-like plate member 28 has an upper or top flat peripheral surface 28e with an upward extending inner peripheral rim or wall portion 28c that is oriented and in a downward position and is positioned inward and spaced from the plurality of fastening or securing holes 26a and surrounding a flow communication opening 28a. This oriented and downward position of the upward extending inner peripheral rim or wall portion 28c is positioned and secured within the inlet and outlet openings 14b of the end tanks by a bonding material and an inner portion of the lower flat peripheral surface 28e engages the top inner rim surface portion 14a that borders the inlet and outlet openings 14b of the end tanks 14 and secured thereto by the bonding material that is selected from the group consisting of at least epoxies, glues and adhesives.

An annular seal member 29 has the same shape as the annular sealing groove or channel 28d with at least a portion of the seal member 29 being disposed therein and with at least a remaining portion thereof being extended above the annular sealing groove or channel 20d.

Also, the identical and interchangeable modular removable mounting and support bracket ring-like plate assembly 15 includes a second top ring-like plate member 23 that is positioned in an opposite orientation to the first bottom ring-like plate member 28 with an upper surface 24 that includes a plurality of fastening or securing holes 26 disposed along an outer peripheral edge thereof and an inner rim or wall portion 25 extending upward there from and positioned inward and spaced from the plurality of fastening or securing holes 26 and surrounding a flow communication opening 27. This upward extending inner peripheral rim or wall portion 25 is attached by the aforementioned bonding material to one end of a flow conduit (not shown) that is in flow communication through the communication opening 27, the communication opening 28a of the first bottom ring-like plate member 28 and the end tank inlet opening 14b, and the other end of the flow conduit (not shown) is connected to power adders, such as turbochargers and superchargers.

The second top ring-like plate member 23 has a lower flat surface 24a that engages and compresses the at least a remaining portion of the seal member 29 to provide an effective seal between the second top ring-like plate 23 and the first bottom ring-like plate member 28 when the plurality of the fastening or securing holes 26a of the first bottom ring-like plate member 28 and the plurality of the fastening or securing holes 26 of the second top ring-like plate member 23 are aligned with one another and fastened together by a plurality of screw fastening members 19. This allows at least one of the second top ring-like plate members 23 to be disconnected from at least one of the first bottom ring-like plate members so that at least one of the end tanks 14 and at least one of the first bottom ring-like plate members are easily removable as a single unit so that cleaning and repair or replacement of an intercooler core (not shown) within the intercooler housing 11 can be performed, cleaning debris and clogging within the interior of the intercooler housing 11 and the cleaning and interchanging or swapping of the end tanks 14 that provides an economic cost savings to customers.

The downward position of the upward extending inner peripheral rim or wall portion 28c is attached by the aforementioned bonding material to one end of a flow conduit (not shown) that is in flow communication through the communication opening 28a of the first bottom ring-like plate member 28, the communication opening 27 of the second top ring-like plate member 23 and the end tank outlet opening 14b, and the other end of the flow conduit (not shown) that is connected to or directly to a throttle body and to a manifold.

Note that the aforementioned bonding material is possible because the end tanks 14 are made of a light weight composite carbon fiber material, which has great heat resistance properties for heat shedding and heat transfer rather than retaining heat. Also, this will allow an intercooler system to be lighter and work well in high temperature environments for a longer period of time than the current or existing intercoolers with all metal components.

However, the need to replace metals with lighter weight composite carbon fiber materials with great mechanical properties in applications that are exposed to fire and heat, which is well known in the fields of aerospace, defense, space, automotive and motor sport applications. Therefore, the lighter weight composite carbon fiber materials will be a great benefit to be utilized in such applications. Note that the composite carbon fiber materials can be selected from the group consisting of organic matrix composites, ceramic matrix composites and also glass-ceramic matrix composites that are reinforced with continuous silicon carbide fibers that is marketed under the name "PyroSic" to name a few.

Figure 4:
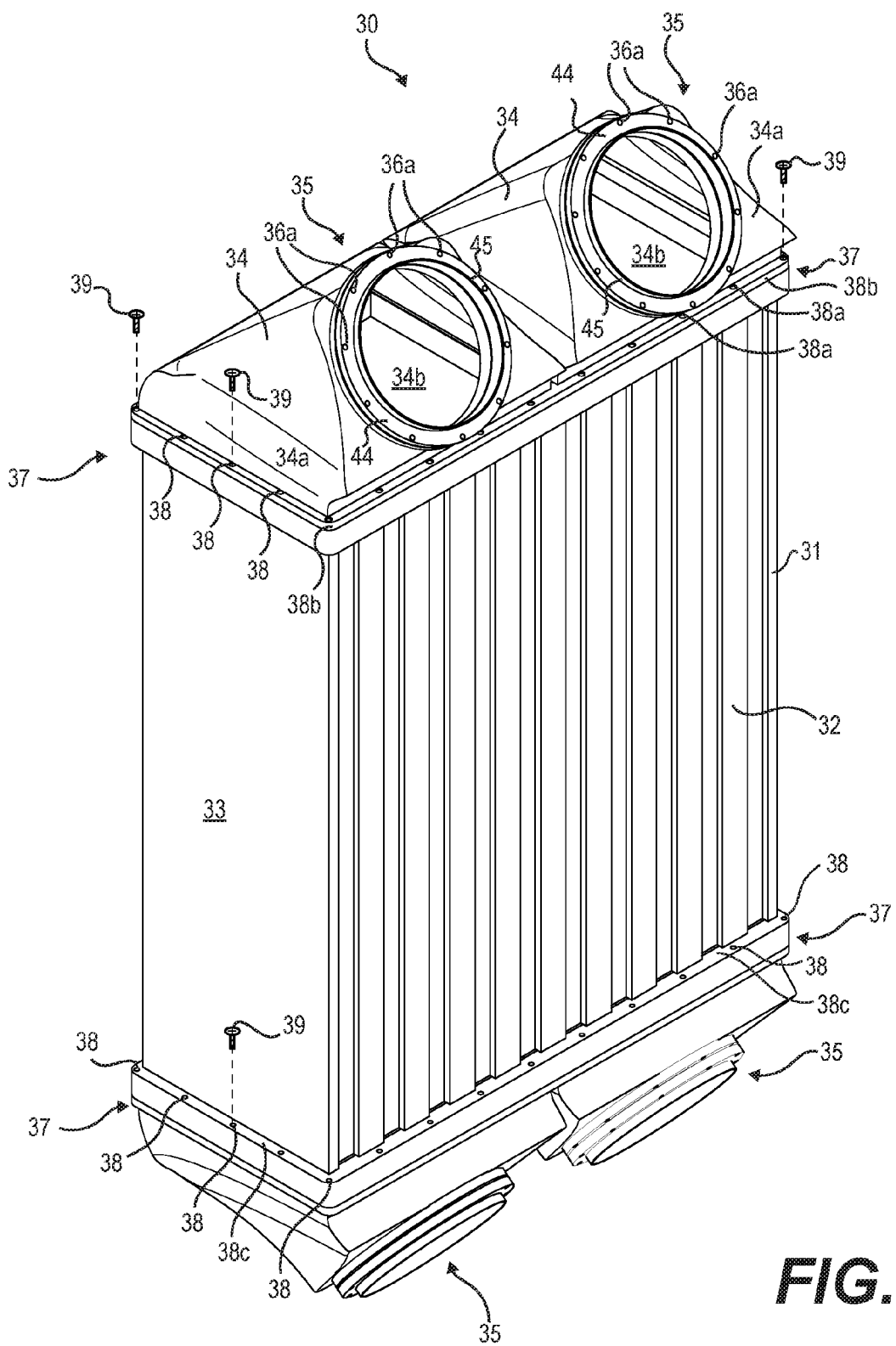
FIG. 4 illustrates an isometric view of an intercooler with modular fixed and removable mounting bracket plate members disposed at top and bottom open ends thereof with screw fastening members for removably securing the modular fixed and removable mounting bracket plate members to the top and bottom open ends of the intercooler and dual or twin end tanks of the intercooler removably secured thereto with identical and interchangeable modular removable mounting and support bracket ring-like plate members with screw fastening members for removably securing them to dual or twin inlets and/or outlets of the dual or twin end tanks according to the present invention.
Figure 5:
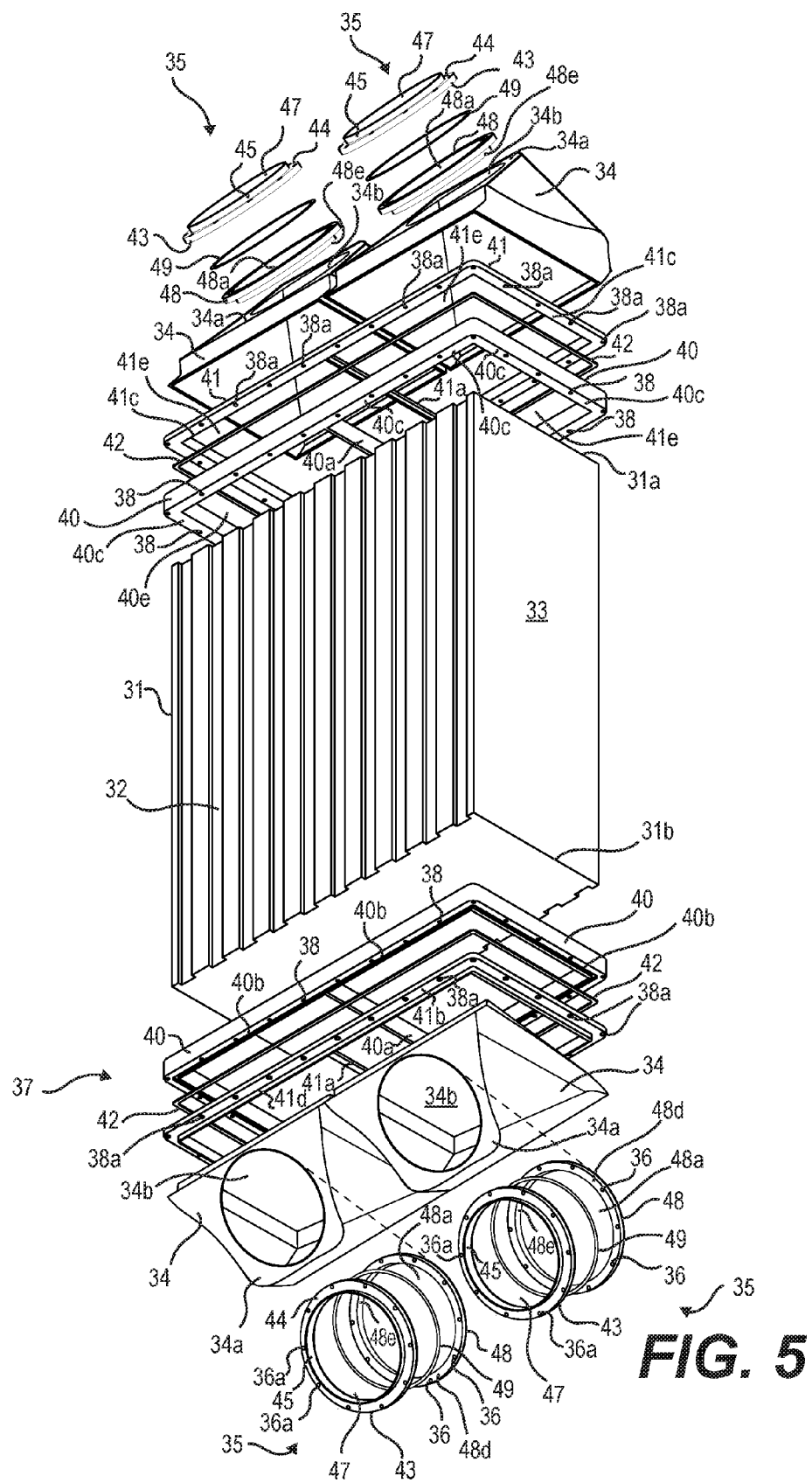
FIG. 5 illustrates an exploded isometric view of the intercooler with modular fixed and removable mounting bracket plate members disposed at both ends thereof with screw fastening members for removably securing the modular fixed and removable mounting bracket plate members to top and bottom open ends of the intercooler and dual or twin end tanks of the intercooler having identical and interchangeable modular removable mounting and support bracket ring-like plate members with screw fastening members for removably securing them to dual or twin inlets and/or outlets of the dual or twin end tanks according to FIG. 4 of the present invention.

FIG. 4 illustrates a perspective isometric view of an intercooler system having dual or twin inlets and outlets 34b at a top or an upper end of the dual or twin end tanks 34 with identical and interchangeable modular removable mounting and support bracket ring-like plate assemblies 35 attached thereto by a plurality of screw fastening members 39 represented by reference number 30 as shown in FIGS. 4 and 5. The intercooler system 30 includes an intercooler housing 31 having front and rear or back walls 32 (front wall shown in FIG. 4 and rear wall shown in FIG. 5), a pair of side walls 33 (see FIGS. 4-5), an upper or top open end 31a and a lower or bottom open end 31b (see FIG. 5). The upper or top open end 31a and the lower or bottom open end 31b of the intercooler housing 31 includes a modular fixed and removable mounting and support bracket plate assembly 37 attached thereto.

The modular fixed and removable mounting and support bracket plate assembly 37 includes a plurality of fastening or securing holes 38 and 38a and a plurality of screw fastening members 39 to be inserted through the plurality of fastening or securing holes 38 and 38a for removably attaching the modular fixed and removable mounting and support bracket assembly 37 to the upper or top open end 31a and the lower or bottom open end 31b, which will be described in greater details below. Each of the top or upper and lower or bottom dual end tanks 34 includes a pair of openings 34b defining dual or twin inlets and outlets that receive an identical and interchangeable modular removable mounting and support bracket ring-like plate assembly 35 secured thereto, which will be described in greater details below.

FIG. 5 illustrates an exploded isometric view of the intercooler housing 31 with the top or upper open end 31a and the bottom or lower open end 31b that receives the modular fixed and removable mounting and support bracket plate assembly 37 and the upper and lower dual inlet and outlet end tanks 34 with the pair of identical and interchangeable modular removable mounting and support bracket ring-like plate assemblies 35 that allows for easy maintenance without replacing an entire intercooler system. Also, the modular arrangement of the fixed and removable mounting and support bracket plate assemblies 37 and the pair of identical and interchangeable modular removable mounting and support bracket ring-like plate assemblies 35 will allow one to change the size and style of current or existing intercoolers by swapping and changing directions of end tanks, as well as changing the length or size of an intercooler core, if needed.

In FIG. 5, the modular fixed and removable mounting and support bracket plate assemblies 37 includes a first bottom or lower plate member 40 with an upper surface 40d that includes the plurality of fastening or securing holes 38 disposed about an outer peripheral edge thereof and an annular peripheral sealing groove or channel 40b is positioned and spaced inward of the plurality of fastening or securing holes 38. The first bottom or lower plate member 40 has a lower flat surface 40c that is welded to the top and bottom open ends 31a and 31b of the intercooler housing 31 with the plurality of fastening or securing holes 38 disposed about an outer peripheral edge thereof. This is the only plate member of the modular fixed and removable mounting and support bracket plate assembly 37 that is permanently fixed. Also, the first bottom or lower plate member 40 has an intermediate partition divider 40a that defines a pair of sectional flow communication openings 40e in flow communication with the inlet and outlet openings 34b of the dual or twin end tanks 34.

An annular seal member 42 has the same shape as the sealing groove or channel 40b with at least a portion of the seal member 42 being disposed therein with at least a remaining portion thereof being extended above the sealing groove or channel 40b.

Further, the modular fixed and removable mounting and support bracket plate assembly 37 includes a second top plate member 41 with an upper surface 41b that includes the plurality of fastening or securing holes 38a therein. The second top plate member 40 has a lower flat surface 41c that engages and compresses the at least a remaining portion of the annular seal member 42 to provide an effective seal between the second top plate member 41 and the first bottom plate member 40 when the plurality of the fastening or securing holes 38 of the first bottom plate member 40 and the plurality of the fastening or securing holes 38a are aligned with one another and fastened together by the plurality of screw fastening members 39 as shown in FIG. 4. This allows the second top plate members 41 and the end tanks 34 to be easily removed together as a single unit so that cleaning and repair or replacement of an intercooler core (not shown) within the intercooler housing 31, the cleaning or flushing of any debris and clogging within an interior of the intercooler housing 31 and the dual or twin end tanks 34 can be easily serviced, swapped and interchanged to allow the intercooler housing 31 and the intercooler core (not shown) to be modified in size and height, which provides an economic cost savings to customers.

Also, the second top plate member 41 has an annular communication flow opening 41e. The annular communication flow opening 41e includes an intermediate partition divider 41a that extends across and attached to opposite sides of the annular communication flow opening 41e to define a pair of sectional flow communication openings 41e. Also, the intermediate partition divider 41a of the second top plate member 41 engages and is supported on the intermediate partition divider 40a of the first bottom plate member 40 only when the second top plate member 41 and the first bottom plate member 40 are fastened together by the plurality of screw fastening members 39. The engaging action of the intermediate partition dividers 40a and 41a will prevent damage and over compression of the annular seal member 42. Note that the pair of sectional flow communication openings 41e of the second top plate member 41 that aligns with the pair of sectional flow communication openings 40e of the first bottom plate member 40 to provide flow communication with the inlet and outlet openings 34b of the end tanks 34.

The second top plate member 41 has an upward extending rim or wall portion 41d positioned inward of the plurality of fastening or securing holes 38a and along an inner peripheral edge thereof. This upward extending rim or wall portion 41d surrounds the pair of sectional flow communication openings 41e and the intermediate partition divider 41a so that the pair of sectional flow communication openings 41e are aligned and in flow communication with the pair of sectional flow communication openings 40e of the first bottom plate member 40 to provide unimpeded flow communication with the inlet and outlet openings 34b of the dual or twin end tanks 34.

Figure 6:
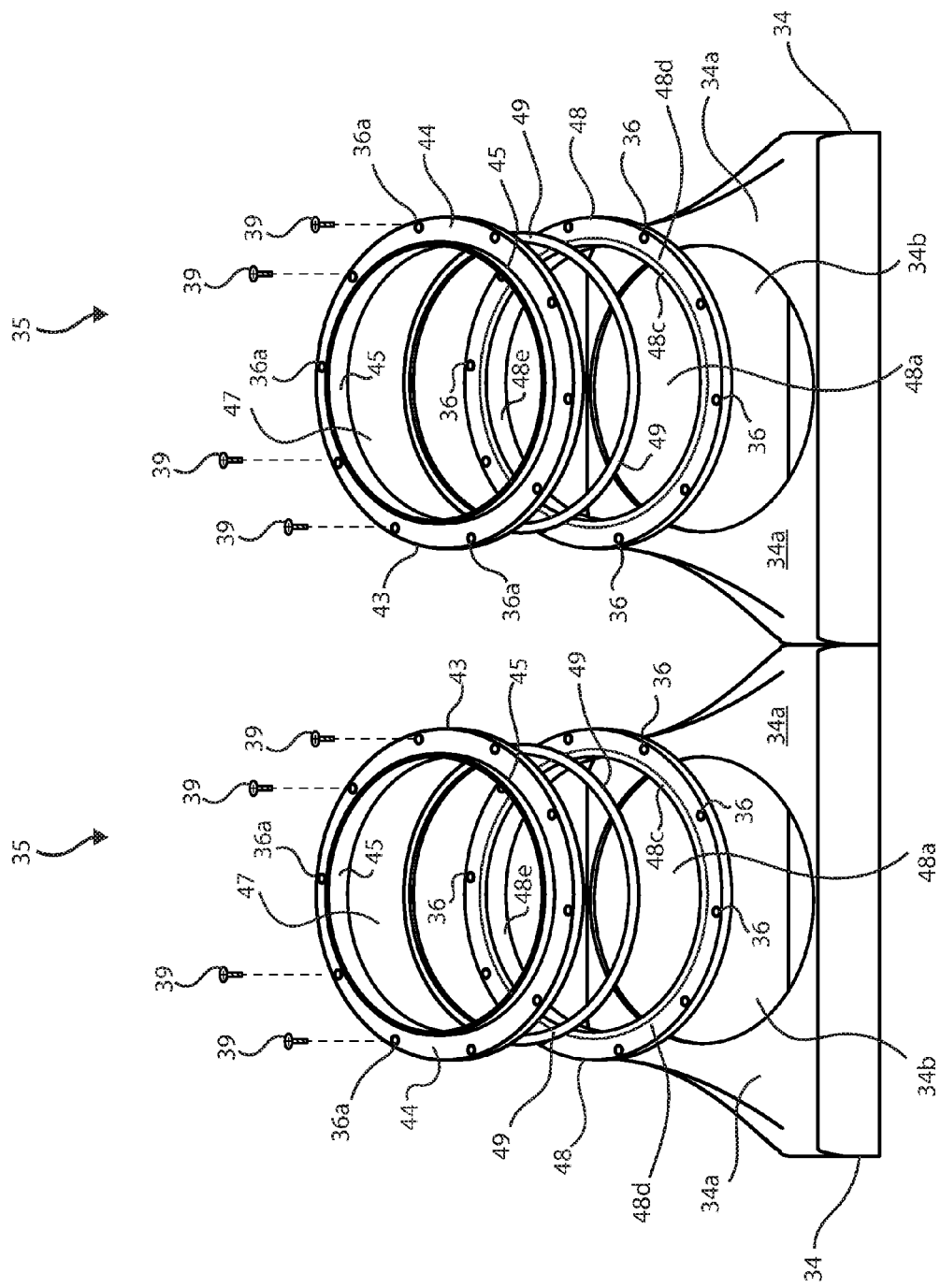
FIG. 6 illustrates an exploded perspective view of dual or twin end tanks with identical and interchangeable modular removable mounting and support bracket ring-like plate members and screw fastening members for removably securing the identical and interchangeable modular removable mounting and support bracket ring-like plate members to dual or twin inlets and/or outlets of the dual or twin end tanks according to the present invention.

Further, each of the dual or twin end tanks 34 includes a top inner rim surface portion 34a that borders the inlet and outlet openings 34b of the dual or twin end tanks 34. The inlet and outlet openings 34b of the dual or twin end tanks 34 are adapted to receive the identical and interchangeable modular removable mounting and support bracket ring-like plate assembly 35. The identical and interchangeable modular removable mounting and support bracket ring-like plate assembly 35 includes a first bottom plate member 48 oriented in a reverse position with an upper a bottom surface 48d that includes a plurality of fastening or securing holes 36 about an outer peripheral edge of thereof and an annular and peripheral sealing groove or channel 48c (see FIGS. 6, 11 and 11A) that is positioned and spaced inward of the plurality of fastening or securing holes 36 as shown in FIGS. 6, 11 and 11A. The first bottom plate member 48 has an upper flat peripheral surface 48b (see FIGS. 6, 11 and 11A) with an upward extending inner peripheral rim or wall portion 48e that is oriented in a downward position and is positioned inward and spaced from the plurality of fastening or securing holes 36 and surrounding a flow communication opening 48a.

This upward extending inner peripheral rim or wall portion 48e extends from an outer periphery of the communication opening 48a and an inner peripheral edge portion of the upper flat peripheral surface 48b (see FIGS. 6, 11 and 11A) that engages a top inner rim surface portion 34a that borders the inlet and outlet openings 34b of the end tanks 34 and secured thereto and within the flow communication opening 48a by a bonding material selected from a group consisting of at least epoxies, glues and adhesives.

An annular seal member 49 has the same shape as the annular sealing groove or channel 48c with at least a portion of the seal member 49 that is disposed therein and with at least a remaining portion thereof being extended above the sealing groove or channel 48c.

The identical and interchangeable modular removable mounting and support bracket ring-like plate assembly 35 includes a second top plate member 43 with an upper or top surface 44 that includes a plurality of fastening or securing holes 36a disposed along an outer peripheral edge thereof and an inner rim or wall portion 45 extending upward there from and positioned inward and spaced from the plurality of fastening or securing holes 36a and surrounding a flow communication opening 47. This upward extending inner peripheral rim or wall portion 45 is attached by the aforementioned bonding means to one end of a flow conduit (not shown) that is in flow communication through the communication opening 47, the communication opening 48a of the bottom plate member 48 and the dual end tank inlet openings 34b, and the other end of the flow conduit (not shown) is connected to power adders, such as turbochargers and superchargers.

Also, the first bottom plate member 48 has a bottom surface 44a with the plurality of fastening or securing holes 36a extended there through and disposed along an outer peripheral edge thereof. The bottom surface 44a engages and compresses the annular seal member 49 into the sealing groove or channel 48c when the plurality of fastening or securing holes 36 and 36a are aligned with one another to fasten the second top plate member 43 and the first bottom plate member 48 together by the plurality of screw fastening members 39.

This dual end tank intercooler type is utilized where there are two power adders (turbochargers or superchargers) that may either be on the same side of the engine or on either side. Note that this dual end tank intercooler setup is primarily used in a vehicle that has two power adders and two throttle bodies. Such dual end tank intercooler type allows one to split an intercooler core to act like two smaller intercoolers, and in this particular setup the air paths are going in the opposite directions, so that the turbocharger is feeding an engine that is located on the opposite side (this is similar to the single inlet and outlet intercooler setup). In one engine setup, two turbochargers are positioned on either side of the engine. The intercooler has an outlet and inlet on each side. Also, in another engine setup is where the intercoolers are horizontal with dual throttle bodies.

FIG. 6 illustrates an exploded perspective view of dual or twin end tanks 34 with the aforementioned identical and interchangeable modular removable mounting and support bracket ring-like plate assemblies 35, annular seal member 49 and screw fastening members 39 removably secured to the dual or twin end tanks 34 about the inlets and/or outlets 34b in the top rim surface 34a.

In order to not be redundant, the description of FIG. 6 will not be discussed because it is the same as described in FIGS. 4 and 5 above. As noted previously, the dual or twin end tanks 34 are made of a light composite carbon fiber material, which has great heat resistant properties for shedding and transferring heat rather than retaining heat. This will allow an intercooler system according to the present invention to be lighter and work well in high temperature environments for a longer period of time than the current or existing intercoolers with all metal components. Note that the above recited description of FIGS. 4-6 will allow the dual or twin end tanks 34 to be easily disassembled to allow for easy maintenance, modification or adaptation of existing or current intercoolers and intercooler cores with the intercoolers modular fixed and modular removable mounting and support bracket plate assemblies 17, 37 and the identical and interchangeable modular removable mounting and support bracket ring-like plate assemblies 15, 35.

As discussed earlier, the need to replace metals with lighter weight composite carbon fiber materials that have great mechanical properties in applications that are exposed to fire and heat, which are well known in the fields of aerospace, defense, space, automotive and motor sport applications would be a great benefit in utilizing the present invention. The light weight composite carbon fiber materials can be selected from the group consisting of organic matrix composites, ceramic matrix composites and also glass-ceramic matrix composites that are reinforced with continuous silicon carbide fibers that is marketed under the name "PyroSic" to name just a few. The aforementioned bonding material discussed earlier is the same securing means that will be utilized to attach the identical and interchangeable modular removable mounting and support bracket ring-like plate assemblies 35 to the dual or twin end tanks 34.

Figure 7:
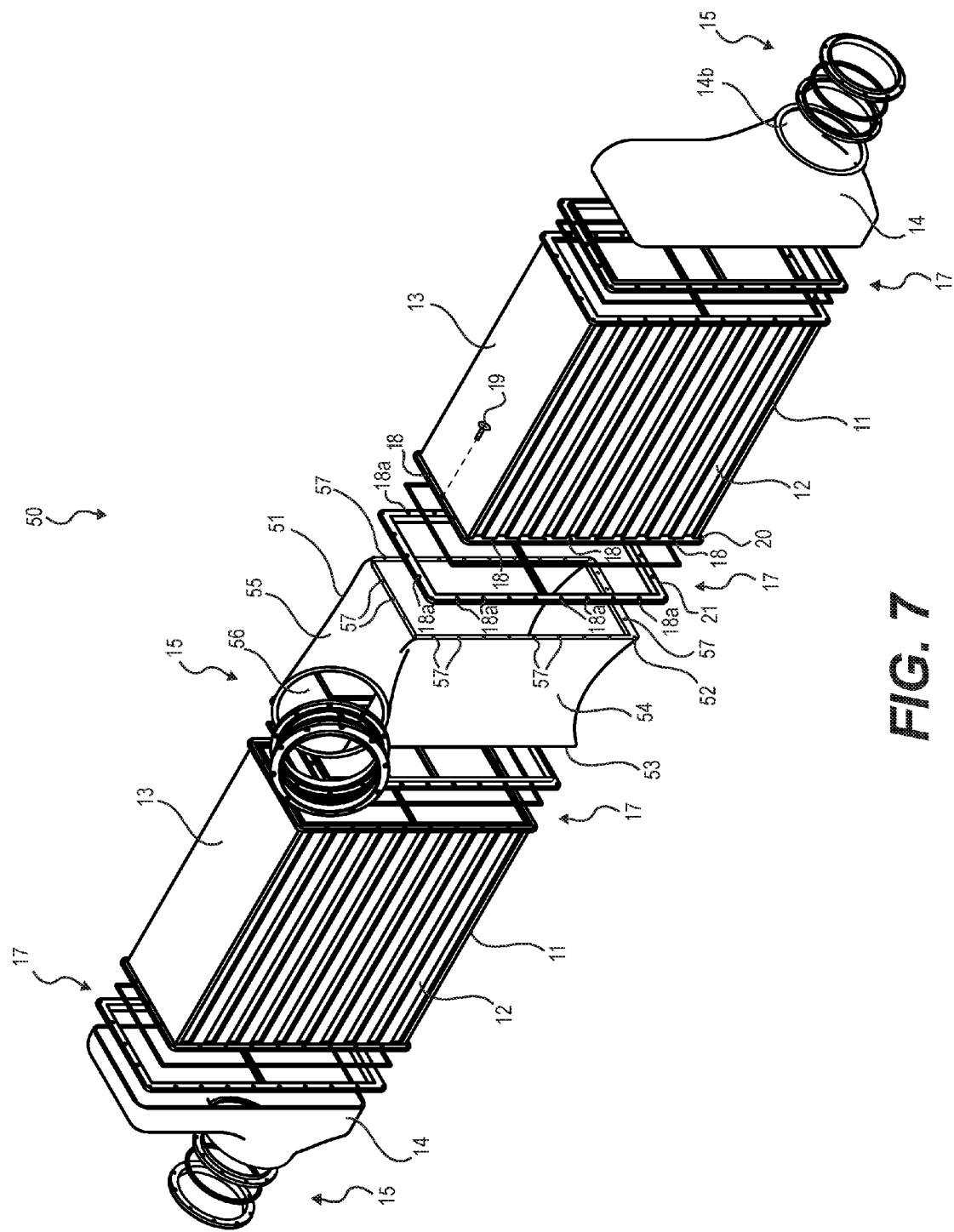
FIG. 7 illustrates an exploded isometric view of a double intercooler each having an end tank with a single inlet and a center outlet disposed there between with modular fixed and removable mounting and support bracket plate assemblies attached thereto according to the present invention.

Referring now to FIG. 7, this embodiment shows double intercoolers with two separate intercooler cores (not shown) with a center outlet. Note that this embodiment is utilized for engines with two power adders (turbochargers or superchargers) and only one throttle body. Further, two cores can be utilized with two inlets on either side and a joining end tank that has an outlet which would either attach directly to the throttle body or to a pipe which would attach to the throttle body.

According to the present invention, FIG. 7 illustrates an exploded perspective view of a double intercooler assembly 50 that includes dual or twin intercooler housings 11 with a pair of ends, each intercooler housing 11 having one end connected to an end tank 14 with a single inlet and an outlet 14b by an identical and interchangeable modular removable mounting and support bracket plate assembly 15. Also, the intercooler housings 11 include front and rear walls 12 and side walls 13. The other end of each of the dual or twin intercooler housings is secured to a center outlet assembly 51 by the aforementioned modular fixed and removable mounting and support bracket plate assembly 17 as shown in FIGS. 1-3 and described above. Further, the center outlet housing assembly 51 includes a top or upper end 52, a bottom or lower end 53, a front wall 54 and a rear wall 54 (not shown), a pair of side walls 55 with an outlet 56 disposed in one of the side walls 55 and a plurality of fastening or securing holes 57 along a peripheral edge of the top or upper end 52 and the bottom or lower end 53.

The top or upper end 52 of the center outlet housing assembly 51 is removably secured to a second top plate member 21 of the modular fixed and removable mounting and support bracket plate assembly 17 and the bottom or lower end 53 of the center outlet housing assembly 51 is removably secured to a second top plate member 21 of the aforementioned modular fixed and removable mounting and support bracket plate assembly 17 of the dual intercooler housings 11. Upon removal of the first bottom plate member 20 that is attached to at least one of the intercooler housings 11 from the second top plate member 21 that is removably attached to the top or upper end 52 of the center outlet housing assembly 51 to allow easy cleaning, interchanging, swapping and/or modification of at least one of the intercooler housings 11, at least one of the intercooler cores (not shown) and the center outlet housing assembly 51.

Figure 8:
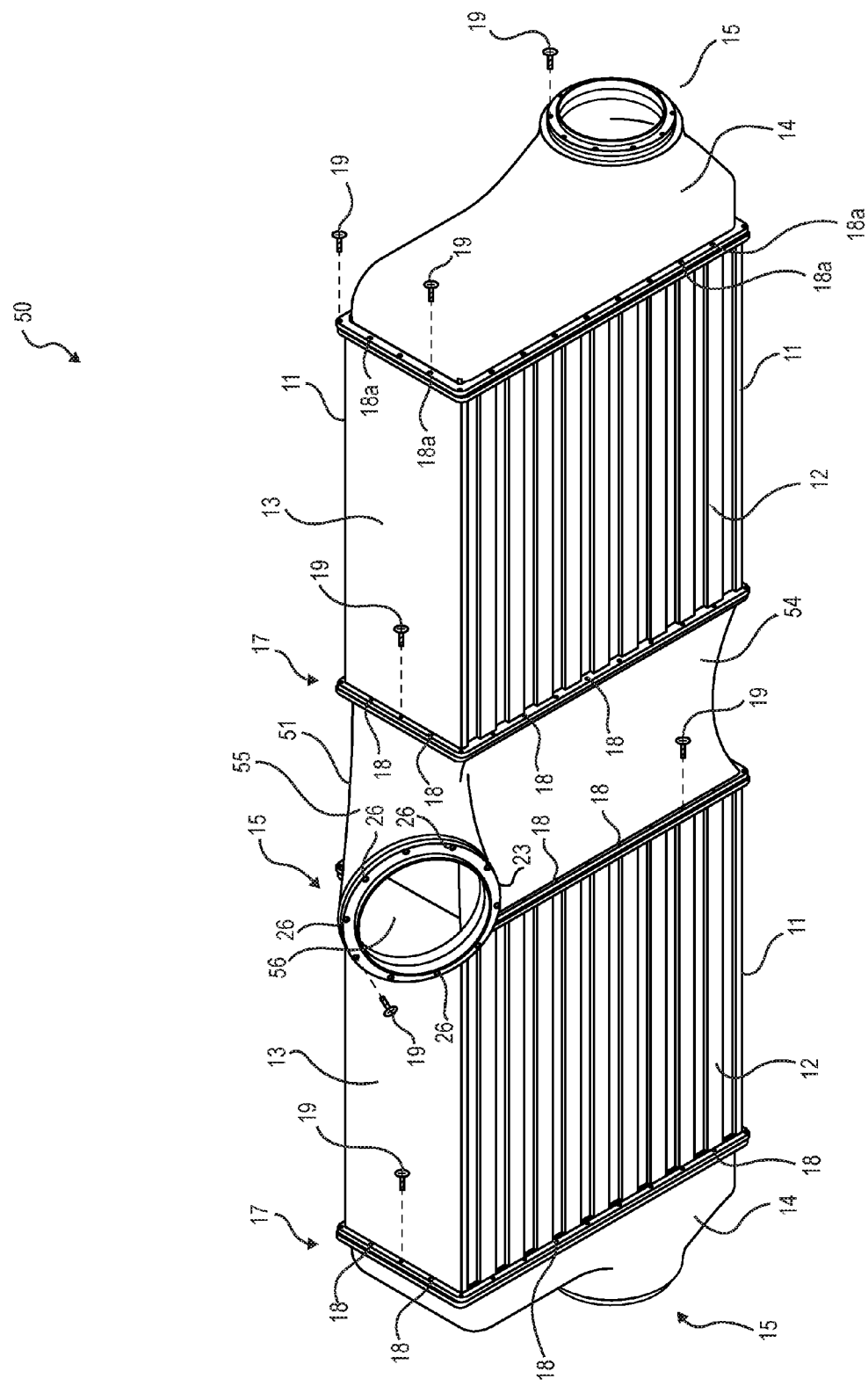
FIG. 8 illustrates an isometric view of the double intercooler each having an end tank with a single inlet and a center outlet disposed there between with modular fixed and removable mounting and support bracket plates and screw fastening members according to FIG. 7 of the present invention.

Now referring to FIG. 8, this embodiment illustrates an assembled perspective view of the double intercooler assembly 50 that includes dual or twin intercooler housings 11 with a pair of ends as described in FIG. 7 above. To eliminate redundancy, detailed description of components as recited and discussed in FIG. 7 above will not be discussed in FIG. 8.

In addition, FIG. 8 shows the plurality of fastening holes 18 and 18a and the plurality of screw fastening members 19 as discussed in greater details above in FIGS. 1-3. The plurality of fastening holes 18 and 18a and the plurality of screw fastening members 19 fastens the top or upper end 52 of the center outlet housing assembly 51 through the fastening or securing holes 57 to the first bottom plate member 20 of the modular fixed and removable mounting and support bracket plate assembly 17 and the bottom or lower end 53 of the center outlet assembly 51 through the fastening or securing holes 57 to the second top plate member 21 and the first bottom plate member 20 of the aforementioned modular fixed and removable mounting and support bracket plate assembly 17. Also, the fastening securing members 19 removably secures the identical and interchangeable modular removable mounting and support bracket ring-like plate assembly 15 together to the outlet 56 of the center outlet housing assembly 51 and the upward extending rim or wall portion 28c of the first bottom ring-like plate member 28 is fitted and bonded within the outlet 56 of the center outlet housing assembly 51 by the aforementioned bonding material. Optionally, the upward extending rim or wall portion 28c of the first bottom ring-like plate member 28 could be fitted and sealed within the outlet 56 of the center outlet housing assembly 51 by other seal type members, if desired.

Figure 9:
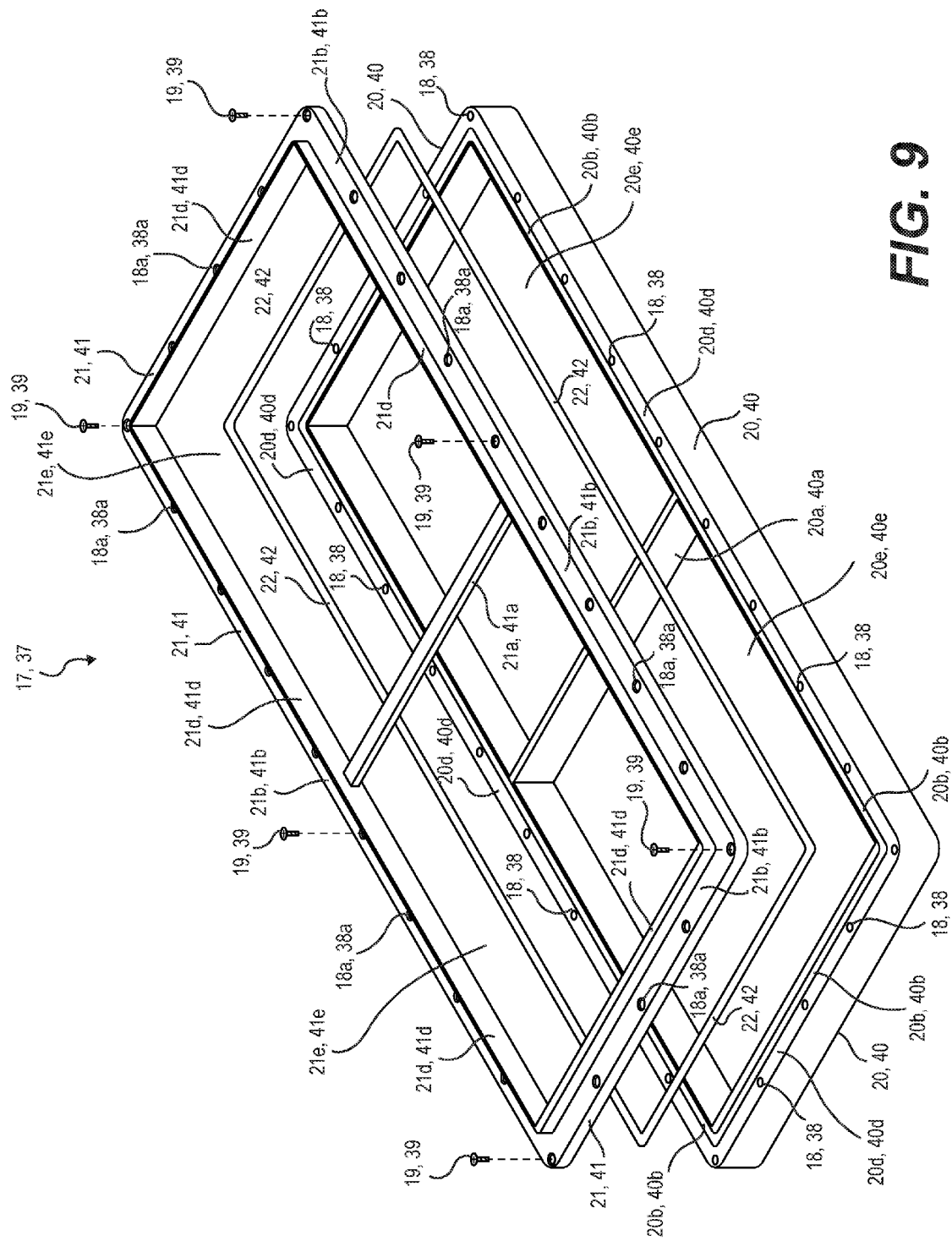
FIG. 9 illustrates an exploded isometric view of a pair of intercooler modular fixed and removable mounting and support bracket plates with screw fastening members and a sealing groove disposed on one of the fixed and removable mounting and support bracket plates with a seal member to be received therein and disposed there between according to the present invention.

FIG. 9 illustrates an exploded isometric view of the aforementioned intercooler modular fixed and removable mounting and support bracket plate assemblies 17, 37.

The identical and interchangeable modular fixed and removable mounting and support bracket plate assemblies 17, 37 includes a first bottom plate member 20, 40 with an upper surface 20d, 40d that includes the plurality of fastening or securing holes 18, 38 disposed about an outer peripheral edge thereof and a peripheral sealing groove or channel 20b, 40b is positioned and spaced inward of the plurality of fastening or securing holes 18, 38. The first bottom plate member 20, 40 has a lower flat surface 40c that is to be welded to the top and bottom open ends of the aforementioned intercooler housings 11, 31 with the plurality of fastening or securing holes 18, 38 disposed about an outer peripheral edge thereof. This is the only plate member of the modular fixed and removable mounting and support bracket plate assembly 17, 37 that is permanently fixed. Also, the first bottom plate member 20, 40 has an intermediate partition divider 20a, 40a that defines a pair of sectional flow communication openings 20e, 40e in flow communication with the inlet and outlet openings 14, 34b of the end tanks 14, 34.

Both of the annual seal members 22, 42 are disposed within the sealing grooves or channels 20b, 40b with at least a portion of the seal members 22, 42 being disposed therein and at least a remaining portion thereof extending above the sealing grooves or channels 20b, 40b.

Further, the modular fixed and removable mounting and support bracket plate assembly 17, 37 includes a second top plate member 21, 41 with an upper surface 21b, 41b that includes the plurality of fastening or securing holes 38a. The second top plate member 20, 40 has a lower flat surface 21c, 41c that engages and compresses the at least a remaining portion of the seal member 22, 42 to provide an effective seal between the second top plate 21, 41 and the first bottom plate member 20, 40 when the plurality of the fastening or securing holes 18, 38 of the first bottom plate member 20, 40 and the plurality of the fastening or securing holes 18a, 38a are aligned with one another and fastened together by screw fastening members 19, 39. This allows the second top plate member 21, 41 and the end tanks 14, 34 to be easily removed as a single unit so that cleaning and repair or replacement of an intercooler core (not shown) within the intercooler housing 11,31, the cleaning and flushing of debris and clogging within an interior of the intercooler housing 11, 31 and the servicing of the dual or twin end tanks 14, 34, which provides an economic cost savings to customers.

Also, the second top plate member 21, 41 has an intermediate partition divider 21a, 41a that engages and is supported on the intermediate partition divider 20a, 40a of the bottom plate member 20, 40 once only when they are fastened together by the plurality of screw fastening members 19, 39 that will prevent damage and over compression of the seal member 22, 42 and defining a pair of sectional flow communication openings 21e, 41e that aligns with the pair of sectional flow communication openings 20e, 40e of the first bottom plate member 20, 40 to provide flow communication with the inlet and outlet openings 14b, 34b of the end tanks 14, 34.

The second top plate member 21, 41 has an upward extending rim or wall portion 21, 41d positioned inward of the plurality of fastening or securing holes 18a, 38a and along an inner peripheral edge thereof. This upward extending rim or wall portion 21d, 41d surrounds the pair of sectional flow communication openings 21e, 41e and the intermediate partition divider 21a, 41a so that the pair of sectional flow communication openings 21e, 41e are aligned with the pair of sectional flow communication openings 20e, 40e of the first bottom plate member 20, 40 to provide unimpeded flow communication with the inlet and outlet openings 14b, 34b of the end tanks 14, 34 to a utility source.

Figure 9A:
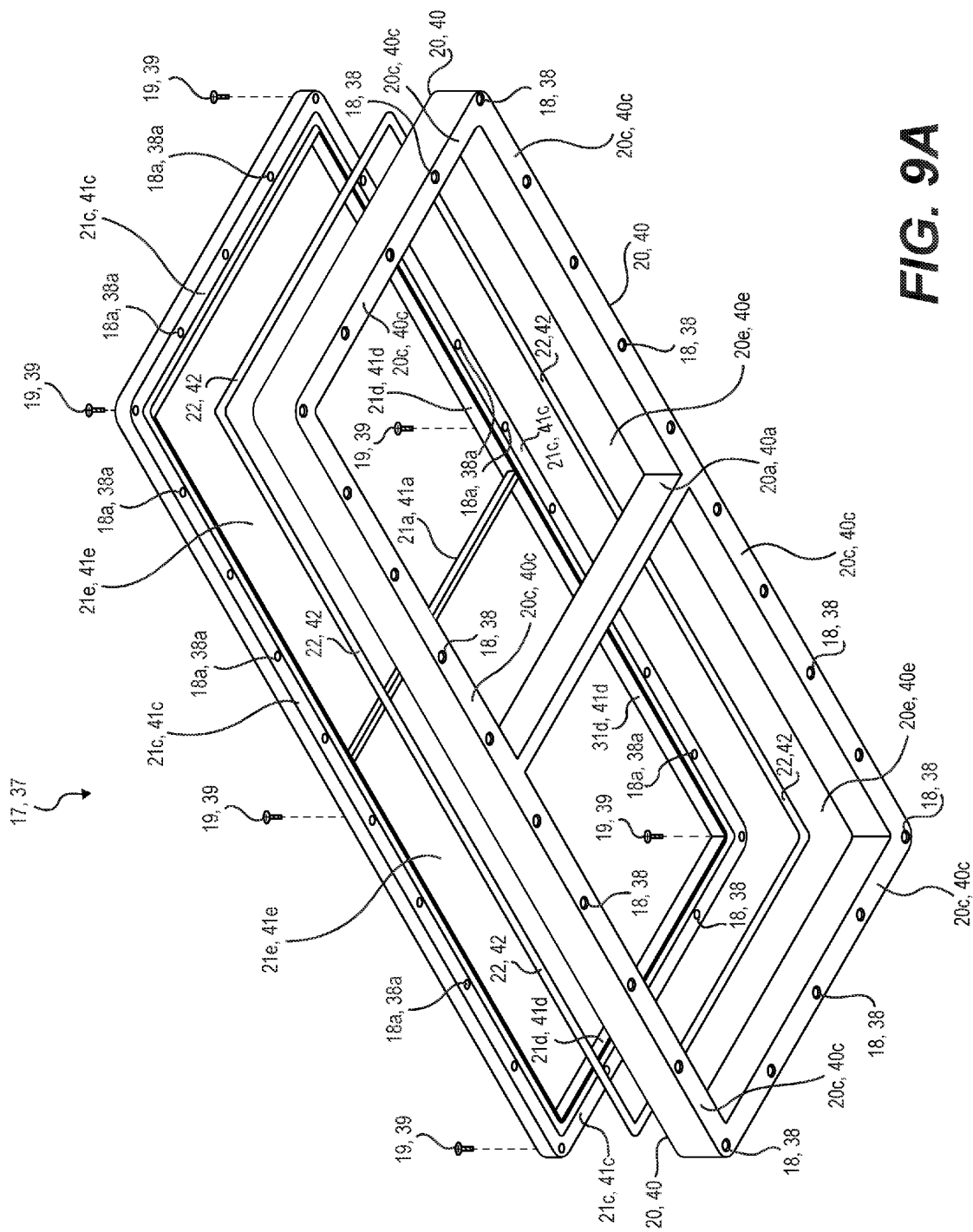
FIG. 9A illustrates a reverse oriented and exploded isometric view of the pair of intercooler modular fixed and removable mounting and support bracket plates with screw fastening members and a sealing groove disposed on one of the fixed and removable mounting and support bracket plates with a seal member to be received therein and disposed there between according to FIG. 9 of the present invention.

FIG. 9A illustrates a reverse oriented exploded isometric view of the pair of intercooler modular fixed and removable mounting and support bracket plate assembly 17, 37 with screw fastening members 19, 39 and a sealing groove 20, 40b disposed on one of the fixed and removable mounting and support bracket plates 20, 40 with a seal member 22, 42 to be received therein and disposed there between according to FIG. 9 of the present invention.

A detailed description of FIG. 9A will not be described since it is just the reverse and have the same components as shown in FIG. 9 and described above, except for the first bottom plate member 20, 40, which shows a bottom surface 20c, 40c and except for the second top plate member 21, 41, which shows a bottom surface 21c, 41c.

It is to be noted that the sealing groove or channel 20b, 40b shown in the first bottom plate member 20, 40 could be in the second top plate member 21, 41 instead, if desired. Also, the sealing groove or channel 20b, 40b could be in the first bottom plate member 20, 40 and could be in the second top plate member 21, 41 as well, if one desires. However, it is preferred that the sealing groove or channel 20b, 40b be in the first bottom plate member 20, 40 because of its thickness opposed to the thinness of the second top plate member 21, 41. Note however, the thickness and the thinness of the first bottom plate member 20, 40 and the second top plate member 21, 41 can vary, if desired.

FIG. 10 illustrates an exploded isometric view of a pair of end tank identical and interchangeable modular removable mounting and support bracket ring-like plates that includes a second top ring-like plate member 23 and a first bottom ring-like plate member 28 that show opposite sides thereof with screw fastening members 19, an annular and peripheral sealing groove or channel 28d disposed on a bottom surface 28b of the first bottom ring-like plate member 28 with an annular seal member 29 that is received therein and disposed between and engaged with the bottom surface 24a of the second top ring-like plate member 23 when fastened together.

The first bottom plate member 28 (see FIGS. 3 and 10) with the bottom surface 28b that includes a plurality of fastening or securing holes 26a about an outer peripheral edge of thereof for receiving a plurality of screw fastening members 19 therein and the annular and peripheral sealing groove or channel 28d is positioned and spaced inward of the plurality of fastening or securing holes 26a for receiving the annular seal member 29 therein.

Further, the first bottom ring-like plate member 28 has a top or upper flat peripheral surface 28e with an inner peripheral rim or wall portion 28c that is oriented and extending downward there from and positioned inward and spaced from the plurality of fastening or securing holes 26a and surrounding a flow communication opening 28a. This downward extending inner peripheral rim or wall portion 28c is positioned within inlet and outlet openings 14b of end tanks 14 the communication opening 28a and in abutting engagement with an inner rim surface area of the communication flow opening 28a and secured therein by the aforementioned bonding material. An inner portion of the top or upper flat peripheral surface 28e engages a top inner rim surface portion 14a of the end tanks 14 (see FIG. 3) that surrounds the inlet and outlet openings 14b of the end tanks 14 and is secured thereto by the bonding material that is selected from the group consisting of at least epoxies, glues and adhesives.

The annular and peripheral sealing groove or channel 28d with at least a portion of the seal member 29 being disposed therein and with at least a remaining portion thereof being extended above the sealing groove or channel 20d that is compressed between the first bottom ring-like plate member 28 and the second top ring-like plate member 23 to establish an effective seal there between.

Also, in FIG. 10, the identical and interchangeable modular removable mounting and support bracket ring-like plate assembly 15 includes a second top ring-like plate member 23 with an upper surface 24 that includes a plurality of fastening or securing holes 26 disposed along an outer peripheral edge thereof and an inner rim or wall portion 25 extending upward there from and positioned inward and spaced from the plurality of fastening or securing holes 26 and surrounding a flow communication opening 27. This upward extending inner peripheral rim or wall portion 25 is attached by the aforementioned bonding material within one end of a flow conduit (not shown) at the top or upper end tank 14 that is in flow communication through the communication opening 27, the communication opening 28a of the first bottom ring-like plate member 28 and the end tank inlet and outlet opening 14b, and the other end of the flow conduit (not shown) is connected to power adders, such as turbochargers and superchargers.

The second top ring-like plate member 23 has a lower flat surface 24a that engages and compresses the at least a remaining portion of the annular seal member 29 to provide an effective seal between the second top ring-like plate 23 and the first bottom ring-like plate 28 when the plurality of the fastening or securing holes 26a of the first bottom ring-like plate member 28 and the plurality of the fastening or securing holes 26 of the second top ring-like plate member 23 are aligned with one another and fastened together by the plurality of screw fastening members 19. This allows the first bottom ring-like plate member 28 and the end tanks 14 (FIG. 3) to be easily detached from the second top ring-like plate member 23 as a single unit so that cleaning and repair or replacement of an intercooler core (not shown) within an intercooler housing 11, cleaning debris from the interior of the intercooler housing 11 (see FIG. 3) and cleaning and servicing the end tanks 14, which provides an economic cost savings and reduced repair down time to customers.

The downward extending inner peripheral rim or wall portion 25 of the second top ring-like plate member 23 at the bottom end tank 14 is attached by the aforementioned bonding material to one end of a flow conduit (not shown) that is in flow communication through the communication opening 28a of the first bottom ring-like plate member 28, the communication opening 27 of the second top ring-like plate member 23 and the end tank outlet opening 14b, and to the other end of the flow conduit (not shown) that is connected to or directly to a throttle body and to a manifold.

FIG. 10A illustrates an exploded isometric view of the end identical and interchangeable tank modular removable mounting and support bracket ring-like plate assembly 15, which is a reverse orientation of FIG. 10, having a plurality of screw fastening members 19 and an annular seal member 29 according to FIG. 10 of the present invention. The components shown in FIG. 10 are the same as shown in FIG. 10A, except for the showing of the top or upper surface 28e of the first bottom ring-like plate member 28 and the bottom surface 24a of the second top ring-like plate member 23.

Note that the annular sealing groove or channel 28d is shown in the bottom surface 28b of the first bottom ring-like plate member 28 as recited above, but could be disposed in the bottom surface 24a of the top plate member 23 instead, if desired. Also, the annular sealing groove or channel 28d could be in both of the first bottom ring-like plate member 28 and the second top ring-like plate member 23, if desired. However, it is preferred that the annular sealing groove or channel 28d be disposed in the bottom surface 28b of the first bottom ring-like plate member 28.

FIG. 11 illustrates an exploded isometric reverse oriented view of the end tank identical and interchangeable modular removable mounting and support bracket ring-like plate assembly 35 including a pair of identical and interchangeable ring-like plate members 43 and 48 having a plurality of screw fastening or securing members 39 for fastening them together and an annular seal member 49 disposed there between. Note that this is a reverse oriented view of FIG. 10 that is similar with different reference numerals, which shows a bottom surface 44a of a second top ring-like plate member 43 and the bottom surface 48d of a first bottom ring-like plate member 48 that are not shown in FIGS. 4-6. Therefore, in order to avoid redundancy, the other components as shown in FIG. 11 will not be discussed because they have been described above in great details for FIGS. 4-6.

FIG. 11A illustrates an isometric reverse oriented view of the end tank identical and interchangeable modular removable mounting and support bracket ring-like plate assembly 35 as shown in FIG. 11 that includes the plurality of screw fastening or securing members 39, the annular seal member 49 and the annular sealing groove 48c disposed on the bottom surface 48d of the first bottom ring-like plate member 48 of the pair of end tank identical and interchangeable modular removable mounting and support bracket ring-like plate members 43 and 48 with the annular seal member 49 to be received within the annular sealing groove 48c therein and disposed between the pair of end tank identical and interchangeable modular removable mounting and support bracket ring-like plate members 43 and 48 according to FIGS. 4-6 of the present invention. However, in order to avoid redundancy, the other components as shown in FIG. 11A will not be discussed because they have been described above in great details in FIGS. 4-6.

In conclusion, a key feature of the identical and interchangeable modular removable mounting and support bracket plate assemblies 15 and 35 of the present invention are designed to allow for the ability to easily clean, assemble and disassemble an intercooler system, in which current or existing intercooler systems that are made of all metal parts or section that are permanent welded and are not able to achieve the same. The permanent welded sections of the current intercooler metal parts or sections are hard to adapt, change and clean. However, the modular fixed and removable mounting and support bracket plate assemblies 17 and 37 of the present invention will allow sections of an intercooler system to be interchanged or arranged in different configurations and easy maintenance/cleaning. Also, another key feature of the modular mounting and support bracket plate assembly designs will allow an intercooler to be changed around and modified by swapping sections that are different in design to fit a variety of different applications, such as flipping end tanks around, outlets and inlets can be moved to either the top or bottom of an intercooler or they can be opposed to one another with an inlet being located at the top of the end tank and one on the bottom of the opposing end tank. In addition, a center outlet housing member can be inserted between a pair of intercooler housing units.

Note that a unique feature of the modular mounting and support bracket plate assemblies 15, 35 and 17, 37 allows an intercooler system to be replaced or modified with versions that are of different sizes, heights and designs in a reduced amount of time.

Another key feature of the present invention is that the end tanks 14, 34 are made of are made of a light weight composite carbon fiber material that has a high heat resistant characteristic (sheds heat) rather than retaining heat and will allow an intercooler system to be lighter and work well in high temperature environments for a longer period of time than the current or existing intercoolers that are made with all metal components.

A further key feature allows the identical and interchangeable modular removable mounting and support bracket ring-like plate assemblies 15, 35 to be secured within the end tank openings 14b, 34b and to the previous recited conduits (not shown) by a bonding material selected from the group consisting of epoxies, glues and adhesives or by other different types of mechanical fastening members. Also, a plurality of screw fastening or securing members 19, 39 this allows the end tanks 14, 34 and the identical and interchangeable modular removable mounting and support bracket ring-like plate assemblies 15, 35 and the modular fixed and removable mounting and support bracket plate assemblies 17 and 37 to be easily removed for adaptability, reparability, serviceability and refining end tank flow characteristics.

While the foregoing written description of the invention enables one of ordinary skill in the art to make and use what is considered presently to be the best mode thereof, those of ordinary skill will understand and appreciate the existence of variations, combinations, and equivalents of the specific embodiment, method, and examples herein. The invention should therefore not be limited by the above described embodiments, and examples, but by all embodiments and methods within the scope and spirit of the invention as claimed.

What is claimed is:

1. An improved intercooler assembly comprising:
   an intercooler housing, the intercooler housing having a top open end and a bottom open end that is interconnected by a pair of side walls, a front wall and a back wall and the top open end and the bottom open end extend across an entire area of the intercooler housing;
   a pair of modular fixed and removable mounting and support bracket plate members secured to and across the entire top open and the bottom open ends along an outer peripheral edge portion thereof, the pair of modular fixed and removable mounting and support bracket support plate members including a first bottom plate member and a second top plate member, each of the first bottom plate member and the second top plate member having a top and bottom flat surface with a flow communication opening extending there through and across the entire area thereof, each bottom flat surface is fixed to the outer peripheral edge portion of each of the top and bottom open ends of the intercooler housing;
   a pair of identical end tanks, each of the pair of identical end tanks having a lower end that is removably secured to an upstanding annular projecting portion of each of the second top plate members, one of the pair of identical end tanks positioned at the top open end of the intercooler housing has a top end with an interchangeable inlet or outlet opening at a top portion thereof and the other one of the pair of identical end tanks positioned at the bottom open end of the intercooler housing has a top end with an interchangeable outlet or inlet at a top portion thereof and is positioned in a reverse orientation opposite the top end of each of the pair of identical end tanks and these identical end tanks with their attached second top plate members are adapted to be interchanged and secured to a first bottom plate member of intercooler housings of different heights;
   the first bottom and second top plate members include an intermediate divider extending across and attached to opposite sides of their respective flow communication opening to define a pair of sectional flow communications openings that are aligned directly above and spaced from one another and a sealing member is disposed between the bottom flat surfaces of the first bottom and second top plate members;
   each of the first bottom second top plate members includes a plurality of fastening holes disposed about and spaced from an outer peripheral edge of each of the first and second plate members and being aligned with one another to receive a plurality of fastening members there through to connect them together to form a unitary plate assembly and simultaneously moving the intermediate partition divider of the second plate member into abutting engagement with the intermediate partition divider of the first plate member to provide an effective seal and prevent over compression of the seal member that is disposed between the first bottom and the second top plate members;
   a pair of identical modular removable mounting and support bracket ring-like plate members removably secured to and within a portion of the interchangeable inlet or outlet openings of the identical pair of end tanks by an upstanding annular rim portion of a first bottom ring-like plate member, a second top ring-like plate member being removably attached to the first bottom ring-like plate member that includes an upstanding annular rim portion adapted to be removably secured to and within a portion of a desired engine utility and each of the identical first bottom and second top ring-like plate members includes a central flow opening extending there through;

each of the identical first bottom and second top ring-like plate members includes a plurality of fastening holes disposed about and spaced from an outer peripheral edge of each of the identical first bottom and second top ring-like plate members and being aligned with one another to receive a plurality of fastening members there through to form a unitary ring-like plate assembly;

a flow communication is allowed to flow through the intercooler housing between the sectional flow communication openings of the unitary plate assemblies and the interchangeable inlets or outlets of the unitary ring-like plate assemblies to and from a desired engine utility; and at least one of the pair of identical end tanks and its second top plate member is easily removable from the first bottom plate member at the at least top open end of the intercooler housing upon removal of the plurality of fastening members to allow access to an interior of the intercooler housing so that it may be easily cleaned and flushed of debris therein via the sectional flow communication openings of the first bottom member without any obstruction.

2. The improved intercooler assembly according to claim 1, wherein the top flat surface of the first bottom plate member of the unitary plate assembly includes an annular sealing groove disposed thereon and positioned between the plurality of fastening holes and the outer periphery of the pair of sectional flow communication openings, the seal member is positioned within the annular groove and engaged by the bottom flat surface of the second top plate member of the unitary plate assembly to selectively compress the seal member there between by the plurality of fastening members extending through the plurality of fastening holes that are disposed around the outer periphery of the second top plate member and the plurality of fastening holes disposed around the outer periphery of the first bottom plate member to provide and maintain an effective seal during flow communication through the interior of the intercooler housing and preventing any leakage.

3. The improved intercooler assembly according to claim 1, wherein a bottom flat surface of the first bottom ring-like plate member of the unitary ring-like plate assembly includes a sealing groove disposed thereon and positioned between the plurality of fastening holes that are disposed about and spaced from the outer peripheral edge of the first bottom ring-like plate member and the central flow opening, a seal member is positioned within the sealing groove and is engaged by a bottom flat surface of the second top ring-like plate member of the unitary ring-like plate assembly to compress the seal member there between by the plurality of fastening members inserted through the aligned plurality of fastening holes that are disposed about and spaced from the outer peripheral edges of the identical first bottom and second top ring-like plate members to provide an effective seal during flow communication through the intercooler housing and preventing leakage.

4. The improved intercooler assembly according to claim 1, wherein the plurality of fastening members is selected from the group consisting of different types of screw fastening members.

5. The improved intercooler assembly according to claim 1, wherein each of the upstanding annular projecting portion of the first second top plate member of the unitary plate assemblies forms an upward extending peripheral wall portion positioned inward of the plurality of fastening holes and along an inner peripheral edge thereof, the upward extending peripheral wall portion surrounds the pair of sectional flow communication openings that defines a bonding surface for removably attaching the lower ends of the pair of identical end tanks thereto, each of the intermediate partition divider of the second top plate members is attached to the opposite sides of the pair of sectional flow communication openings at the inside of the upward extending peripheral wall portion, the pair of sectional flow communication openings of each of the second top plate members are aligned above the pair of sectional flow communication openings of the first bottom plate member and is able to provide unimpeded flow communication there through via the interchangeable inlet and outlet openings of the pair of identical end tanks, the central openings of each of the identical ring-like plate assemblies and through the interior of the intercooler housing.

6. The improved intercooler assembly according to claim 1, wherein each of the fixed bottom flat surfaces of the first bottom plate members of the unitary plate assemblies is welded to the top and bottom open ends of the intercooler housing, which is the only plate member of each of the modular fixed and removable mounting and support bracket plate assemblies that is permanently fixed thereto.

7. The improved intercooler assembly according to claim 5, wherein the upward extending peripheral wall portion of each of the second top plate members is secured to the bottom end of the pair of identical end tanks by a bonding material selected from the group consisting of epoxies, glues and adhesives, which allows each of the second top plate members and the pair of identical end tanks to be easily removed as a single unit for changing, modifying, swapping, cleaning and repairing to reduce expensive costs attributed to intercooler system damage and debris clogging.

8. The improved intercooler assembly according to claim 1, wherein the pair of identical end tanks are made from a material selected from the group consisting of a light weight composite carbon fiber material, the light weight composite carbon fiber material has a high heat resistance characteristic, which will allow the improved intercooler assembly to be lighter and work well in high temperature environments for a longer period of time than the existing intercoolers with all metal components, the composite carbon fiber materials may be selected from the group consisting of organic matrix composites, ceramic matrix composites and also glass-ceramic matrix composites that are reinforced with continuous silicon carbide fibers.

9. The improved intercooler assembly according to claim 7, wherein each of the pair of identical end tanks disposed on the top and bottom open ends of the intercooler housing is interchangeable and adapted to be fitted instead with a pair of dual end tanks, each pair of the interchangeable dual end tanks includes an interchangeable inlet and outlet that are disposed on a top end and a lower end thereof and is secured by the bonding material to the upward extending peripheral wall portion of each of the second top plate members of each of the unitary plate assemblies, each of the bottom flat surfaces of the first bottom plate members of the unitary plate assemblies is secured by a weld to the top and bottom open ends of the intercooler housing and the first bottom plate members of the modular fixed and removable mounting and support bracket plate assemblies are the only components that are permanently fixed to the intercooler housing.

10. The improved intercooler assembly according to claim 9, wherein each pair of the interchangeable dual end tanks is adapted to be fitted on the pair of modular fixed and removable mounting and support bracket plate members that are secured to the top open and the bottom open ends of the intercooler housing by the pair of the first bottom plate members with the sectional flow communication openings through the top and bottom flat surfaces to allow flow communication opening extending there through;
   the plurality of fastening holes for each of the pair of first and second plate members is disposed about and spaced from the outer peripheral edge of each of the pair of first and second plate members and being aligned with one another to receive the plurality of screw fastening members there through to joined together the unitary plate assembly;
   the pair of modular removable mounting and support bracket ring-like plate members is removably secured to the interchangeable inlet and outlet openings of the dual end tanks by the pair of the first bottom ring-like plate members and the pair of the second top ring-like plate members being are removably attached to the pair of the first ring-like plate members;
   the plurality of fastening holes for each of the pair of first and second ring-like plate members are disposed about and spaced from the outer peripheral edge of each pair of the first and second ring-like plate members are aligned with one another to receive the plurality of screw fastening members there through to removably assemble together the pair of unitary ring-like plate assemblies to the interchangeable inlets and outlets of the interchangeable dual end tanks; and
   the flow communication that is allowed to flow through the intercooler housing between the central flow communication openings of each of the pair of unitary plate assemblies and the interchangeable inlets and outlets of each of the pair of unitary ring-like plate assemblies to and from a desired engine utility.

11. An improved intercooler and mounting bracket assembly comprising:
   at least one intercooler housing having a top open end, a bottom open end, pair of side walls, a front wall and a back wall, the bottom open end is interconnected by the pair of side walls, the front wall and the back wall and the top open end and the bottom open end extend across an entire area of the at least one intercooler housing;
   a pair of modular fixed and removable mounting and support bracket plate members is secured to and across the entire top open and the bottom open ends of the at least one intercooler housing and along an outer peripheral edge portion thereof, the pair of modular fixed and removable mounting and support bracket support plate members including a first bottom plate member and a second top plate member, each of the first bottom plate member and the second top plate member having a top and bottom flat surface with a flow communication opening extending there through and across the entire area thereof, each of the bottom flat surfaces is fixed to the outer peripheral edge portion of each of the top and bottom open ends of the at least one intercooler housing;
   each top flat surface of the first bottom plate members is removably attached to a second top plate member, the bottom flat surface of the second top plate member is removably attached to the top flat surface of the first bottom plate member at the top and bottom open ends of the at least one intercooler housing, each top flat surface of the second top plate members includes an upstanding peripheral wall portion that extends around the flow communication openings thereof;
   at least one end tank including a top end and a bottom end, the top end having an inlet opening disposed thereon and the bottom end of the at least one end tank is removably attached to the upstanding peripheral wall portion and over the entire area of the flow communication openings of the bottom plate members and the second top plate members of the top and bottom open ends of the at least one intercooler housing, the at least one end tank and the second top plate member is adapted to be removable as a unit and is interchangeable with the at least one intercooler housing of different sizes and secured to the same first bottom plate members that is secured to their top and bottom open ends;
   the first and second plate members include an intermediate divider extending across and attached to opposite sides of their respective flow communication opening to define a pair of sectional flow communications openings that are aligned directly above and spaced from one another and a sealing member is disposed between the top flat surfaces of the first bottom plate members and the bottom flat surfaces of the second top plate members secured to the top and bottom open ends of the at least one intercooler housing;
   the first bottom and second top plate members disposed at the top and bottom open ends of the at least one intercooler housing includes a plurality of fastening holes disposed about and spaced from an outer peripheral edge of each of the first bottom and second top plate members and being aligned with one another to receive a plurality of screw fastening members there through to connect them together to form unitary plate assemblies, while simultaneously moving the intermediate partition divider of each of the second top plate members into abutting engagement with the intermediate partition divider of each of the first bottom plate members to eliminate over compression and damage to the seal member disposed between the first bottom and second top plate members;
   an interchangeable outlet member is removably attached to the upstanding peripheral wall portion that extends at least across the entire area of the top flat surface of the second top plate member at the bottom open end of the at least one intercooler housing; and
   the at least one end tank and the second top plate member are easily removable as a single unit from the first bottom plate member at the top open end of the at least one intercooler housing to allow full access to an interior of the at least one intercooler housing to easily clean and flush debris and clogging therein through the sectional flow communication openings of the first bottom plate member without removal of the at least one intercooler housing.

12. The improved intercooler and mounting bracket assembly according to claim 11, wherein the interchangeable outlet member includes a pair of side walls, a front wall and a back wall that are interconnected together to form an outlet housing unit with a top open end, and a bottom open end and an outlet flow opening disposed within one of the pair of side walls.

13. The improved intercooler and mounting bracket assembly according to claim 12, wherein the at least one intercooler housing includes at least another intercooler housing, the at least another intercooler housing having a pair of side walls, a front wall and a back wall that is interconnected together with a top open end and a bottom open end;
   at least another modular mounting and support bracket plate member attached to the top open and the bottom open ends of the at least another intercooler housing by at least another first bottom plate member having a top and bottom flat surface with a flow communication opening extending there through;
   the bottom flat surface of the at least another first bottom plate member is fixedly attached to the top open end of the at least another intercooler housing, the top flat surface of the another first bottom plate member is removably attached to at least another second top plate member, the at least another second top plate member having a top and bottom flat surface with a flow communication opening extending there through, the top flat surface includes an upstanding peripheral wall portion that completely surrounds the flow communication opening, and the bottom flat surface of the at least another second top plate member is removably attached to the top flat surface of the at least another first bottom plate member; and
   the bottom open end of the interchangeable outlet housing unit is removably attached to the upstanding peripheral wall portion of the top flat surfaces of the second bottom plate member of the at least another intercooler housing and each of the first bottom and second top plate members of the top and bottom open ends of the at least another intercooler housing includes a plurality of fastening holes disposed about and spaced from an outer peripheral edge of each of the first bottom and second top plate members and being aligned with one another to receive a plurality of screw fastening members there through to connect them together to form unitary plate assemblies.

14. The improved intercooler and mounting bracket assembly according to claim 13, wherein each of the top flat surfaces of the first bottom plate members of the at least another intercooler housing includes a sealing groove disposed thereon between the plurality of fastening holes and each flow communication openings, a seal member is positioned within each of the sealing grooves and engaged by each of the bottom flat surfaces of each of the second top plate members of the at least another modular mounting and support bracket plate member and compressing the seal member there between by the plurality of fastening members to define unitary plate assemblies that provide an effective seal during flow communication through the at least another intercooler housing to prevent any fluid leakage.

15. The improved intercooler and mounting bracket assembly according to claim 14, wherein each of the first bottom and second top plate members of each of the unitary plate assemblies have an intermediate partition divider that defines a pair of sectional flow communication openings, each of the second top plate members of each of the unitary plate assemblies have an intermediate partition divider that engages and is supported on each of the intermediate partition dividers of the first bottom plate member of each of the unitary plate assemblies defining a pair of sectional flow communication openings that aligns with each of the pair of sectional flow communication openings of each of the first bottom plate members and each of the second top plate members of each of the unitary plate assemblies are fastened together by the plurality of screw fastening members to provide flow communication through the outlet flow opening of the outlet housing unit;
   the plurality of fastening holes disposed about and spaced from the outer peripheral edge of each of the first bottom and second top plate members that is aligned with one another to receive the plurality of screw fastening members there through to connect them together to form the unitary plate assemblies and simultaneously adjusting the intermediate partition divider of each of the second top plate members into abutting engagement with the intermediate partition divider of each of the first bottom plate members to eliminate over compression damage to the seal member disposed between the first bottom and second top plate members of the unitary plate assemblies; and
   the outlet housing unit is removably attached to the upstanding peripheral wall portion that extends at least across the entire area of the top flat surface of the second top plate member to the bottom open end of the at least another intercooler housing by the plurality of screw fastening members.

16. The improved intercooler assembly according to claim 15, wherein at least another end tank including a top end and a bottom end, the top end having an inlet opening disposed thereon and the bottom end of the at least another end tank is removably attached to an upstanding peripheral wall portion of a first bottom plate member and a second top plate member at the top and bottom open ends of the at least another intercooler housing, each of the first bottom and the second top plate members includes a flow communication opening therein that extends over an entire area thereof, the first bottom and the second top plate members includes a plurality of fastening holes disposed around the outer periphery of the first bottom and the second top plate members and a plurality of screw fastening members for releaseably fastening the first bottom and the second top plate members via the plurality of fastening holes together that define the unitary plate assemblies; and
   upstanding peripheral wall portion of the second top plate members at the bottom open ends of each of the of the at least one intercooler housing and the at least another intercooler housing is inserted within and secured to the top and bottom open ends of the outlet housing unit by the plurality of screw fastening members for easy removable for service, repair, adaptability of intercoolers by modifying sections by swapping and by changing size and design to fit a variety of applications.

17. The improved intercooler and mounting bracket assembly according to claim 16, wherein each of the inlet openings of the at least one and the at least another end tanks at the top end thereof include a pair of identical modular and removable mounting bracket ring-like plate members having a portion that is removably secured within each of the inlet openings, the bottom ends of the at least one and the at least another end tanks are bonded to the upstanding peripheral extending wall portion of each of the second top plate members of the unitary plate assemblies at the top and bottom open ends of each of the of the at least one intercooler housing and the at least another intercooler housing and each of the inlet openings at the top ends of each of the at least one and the at least another end tanks are in flow communication via the pair of identical modular and removable mounting bracket ring-like plate members; and the at least another end tank and its second top plate member is removable as a single unit and is adapted to be interchanged with the at least another intercooler housing of different sizes and secured to its first bottom plate member to accommodate different application designs.

18. The improved intercooler and mounting bracket assembly according to claim 17, wherein each identical modular removable mounting bracket ring-like plate member includes a pair of identical ring-like plate members, the pair of identical ring-like plate members include a first bottom ring-like plate member having top and bottom flat surfaces, a central flow communication opening disposed there through, an upstanding peripheral wall portion extending around the central flow communication opening and spaced inward of a plurality of screw fastening holes, a second top ring-like plate member having top and bottom flat surfaces, a central flow communication opening disposed there through, and an upstanding peripheral wall portion extending around the central flow communication opening and spaced inward of a plurality of screw fastening holes, the first bottom ring-like plate member central flow communication opening and the second top ring-like plate member central flow communication openings are in alignment with one another and is secured together by a plurality of screw fastening members via the plurality of screw fastening holes of each of the a first bottom ring-like plate member and the second top ring-like plate member to form a unitary modular removable mounting bracket ring-like plate assembly;

each of the first bottom and second top ring-like plate members plurality of fastening holes is disposed about and spaced from an outer peripheral edge of each of the first bottom and second top ring-like plate members and being aligned with one another to adjustably receive the plurality of screw fastening members there through;

each of the bottom flat surfaces of the first bottom plate members of the modular removable mounting bracket ring-like plate assembly includes a sealing groove disposed thereon between the plurality of fastening holes and its central flow communication opening, a seal member is positioned therein and engaged by each of the bottom flat surfaces of the second top plate members of the unitary modular removable mounting bracket ring-like plate assemblies to compress its seal member there between by its plurality of screw fastening members to maintain an effective seal during flow communication through each of the at least one intercooler housing and the at least another intercooler housing and through the outlet flow opening of the outlet housing unit;

a pair of identical modular removable mounting and support bracket ring-like plate members removably secured to and within a portion of the outlet flow opening of the outlet housing unit by an upstanding annular rim portion of a first bottom ring-like plate member, a second top ring-like plate member being removably attached to the first ring-like plate member that includes an upstanding annular rim portion adapted to be removably secured to and within a portion of a desired engine utility and each of the identical first and second ring-like plate members includes a central flow opening extending there through;

each of the identical first bottom and second top ring-like plate members includes a plurality of fastening holes disposed about and spaced from an outer peripheral edge of each of the identical first and second ring-like plate members and being aligned with one another to receive a plurality of fastening members there through to form a unitary ring-like plate assembly; and the first bottom plate member of the unitary ring-like plate assembly includes a sealing groove disposed thereon between the plurality of fastening holes and its central flow communication opening, a seal member is positioned therein and engaged by each of the bottom flat surfaces of the second top plate members of the unitary modular removable mounting bracket ring-like plate assemblies to compress its seal member there between by its plurality of screw fastening members to maintain an effective seal during flow communication through each of the at least one intercooler housing and the at least another intercooler housing and through the outlet flow opening of the outlet housing unit to a utility source.

19. The improved intercooler and mounting bracket assembly according to claim 18, wherein each of the upstanding peripheral wall portion of the first bottom plate members of the modular removable mounting bracket ring-like plate assembly is removably secured within a portion of the outlet flow openings at the upper ends of each of the at least one and the at least another end tanks by the bonding material, each of the upstanding peripheral wall portion of each of the second top plate members of the modular removable mounting bracket ring-like plate assembly is removably secured within a portion of a utility source by the bonding material;

the at least one intercooler housing and the at least another intercooler housing form a dual inlet and single outlet intercooler system arrangement; and the bonding material is selected from the group consisting of epoxies, glues and adhesives, which allows the unitary plate assemblies, unitary ring-like plate assemblies and the end tanks to be easily removed for changing, modifying, swapping, cleaning and repairing of the at least one intercooler housing and the at least another intercooler housing to reduce expensive costs that can be attributed to intercooler system damage, debris clogging and different sizes and designs.

20. The improved intercooler mounting bracket assembly according to claim 19, wherein the end tanks are made from a material of a light weight composite material that has high heat resistant characteristics, which will allow the dual inlet and single outlet intercooler system arrangement to be lighter and work well in high temperature environments for a longer period of time than the existing intercoolers with all metal components, the composite carbon fiber materials can be selected from the group consisting of organic matrix composites, ceramic matrix composites and also glass-ceramic matrix composites that are reinforced with continuous silicon carbide fibers.

* * * * *